(12) United States Patent
Ikawa et al.

(10) Patent No.: US 9,298,854 B2
(45) Date of Patent: Mar. 29, 2016

(54) TIME-SERIES DATA MANAGEMENT DEVICE, SYSTEM, METHOD, AND PROGRAM

(75) Inventors: Naoki Ikawa, Zushi (JP); Shinichi Kawamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 313 days.

(21) Appl. No.: 13/643,019

(22) PCT Filed: May 14, 2010

(86) PCT No.: PCT/JP2010/058167
§ 371 (c)(1),
(2), (4) Date: Dec. 19, 2012

(87) PCT Pub. No.: WO2011/142026
PCT Pub. Date: Nov. 17, 2011

(65) Prior Publication Data
US 2013/0103657 A1   Apr. 25, 2013

(51) Int. Cl.
*G06F 17/30* (2006.01)
(52) U.S. Cl.
CPC .... *G06F 17/30985* (2013.01); *G06F 17/30312* (2013.01); *G06F 17/30551* (2013.01)
(58) Field of Classification Search
CPC ............... G06F 17/30312; G06F 17/30551; G06F 2201/835; G06F 17/30985
USPC ................................. 707/693, 725
See application file for complete search history.

(56) References Cited

U.S. PATENT DOCUMENTS

| 5,418,943 | A | * | 5/1995 | Borgida | G06F 17/30507 |
| 5,544,281 | A | * | 8/1996 | Maruoka | G06N 5/04 706/58 |
| 5,664,174 | A | * | 9/1997 | Agrawal | G06F 17/30548 |
| 6,065,014 | A | * | 5/2000 | Wakio | G06F 17/30539 |
| 6,149,894 | A | * | 11/2000 | Yamane | A61K 8/19 424/49 |
| 6,370,536 | B1 | * | 4/2002 | Suzuki | G06F 17/30899 707/693 |
| 6,609,134 | B1 | | 8/2003 | Chang et al. | |

(Continued)

FOREIGN PATENT DOCUMENTS

| JP | 10-320400 A | 12/1998 |
| JP | 2000222439 A | 8/2000 |

(Continued)

OTHER PUBLICATIONS

B. Babcock, S. Babu, M. Datar, R Motwani and J. Widom, "Models and Issues in Data Stream Systems", Department of Computer Science, Stanford University, Stanford, CA, USA, pp. 1-16 (2002).

*Primary Examiner* — Pierre Vital
*Assistant Examiner* — Nargis Sultana
(74) *Attorney, Agent, or Firm* — Volpe and Koenig, P.C.

(57) ABSTRACT

Disclosed is a time-series management device capable of filtering time-series data having a possibility of matching a specified search pattern and reading in the data from a storage device when performing a time-series analysis. A data accumulation unit (120) creates a time-series index having a feature value of a data series calculated at a specific regular time interval. In addition, a data search unit (130) makes a decision as to the feature value for each regular time interval included in the time-series index using an evaluation formula of a specified search condition, identifies a time period of a complying data series group, and performs a time-series analysis for only the data series of the identified time period.

14 Claims, 34 Drawing Sheets

(56) References Cited

U.S. PATENT DOCUMENTS

| | | | | |
|---|---|---|---|---|
| 6,685,475 | B1* | 2/2004 | Maruyama | G09B 5/14 434/118 |
| 7,657,584 | B2* | 2/2010 | Kawamura | G06F 17/3012 707/610 |
| 7,941,413 | B2* | 5/2011 | Kashiyama | G06F 17/30336 707/696 |
| 7,962,437 | B2* | 6/2011 | Brandenburg | G06F 11/0706 706/18 |
| 7,979,439 | B1* | 7/2011 | Nordstrom | G06F 17/30312 707/741 |
| 8,423,493 | B2* | 4/2013 | Moerchen | G06F 11/008 706/45 |
| 2001/0051939 | A1* | 12/2001 | Yoshimura | G06F 17/30368 |
| 2002/0012518 | A1 | 1/2002 | Nagasaka et al. | |
| 2002/0032696 | A1* | 3/2002 | Takiguchi | G06F 17/30126 715/255 |
| 2003/0093442 | A1* | 5/2003 | Mogi | G06F 17/30315 |
| 2005/0060317 | A1* | 3/2005 | Lott | G06Q 10/00 |
| 2005/0246161 | A1* | 11/2005 | Sakurai | G06Q 30/02 704/10 |
| 2005/0254364 | A1* | 11/2005 | Kuroda | G11B 20/00086 369/47.1 |
| 2007/0130171 | A1* | 6/2007 | Hanckel | G06F 17/30551 |
| 2008/0120309 | A1* | 5/2008 | Copeland | G06F 17/30309 |
| 2008/0120346 | A1* | 5/2008 | Neogi | G06F 17/30312 |
| 2008/0208890 | A1* | 8/2008 | Milam | G05B 23/0264 |
| 2008/0222123 | A1* | 9/2008 | Colby | G06F 17/30448 |
| 2009/0216787 | A1* | 8/2009 | Wang | G06F 17/30241 |
| 2010/0036857 | A1* | 2/2010 | Marvasti | G06F 17/30598 707/725 |
| 2010/0257147 | A1* | 10/2010 | De Peuter | H03M 7/30 707/693 |
| 2011/0218978 | A1* | 9/2011 | Hong | G06F 17/30551 707/694 |
| 2011/0238703 | A1* | 9/2011 | Porter | G06F 17/30551 707/792 |
| 2011/0302187 | A1* | 12/2011 | Otsuka | G06F 17/30395 707/768 |
| 2012/0117079 | A1* | 5/2012 | Baum | G06F 17/30342 707/746 |
| 2012/0185464 | A1* | 7/2012 | Kuroda | G06F 17/30563 707/722 |
| 2012/0262472 | A1* | 10/2012 | Garr | G06T 11/206 345/589 |
| 2012/0330931 | A1* | 12/2012 | Nakano | G06F 17/30424 707/722 |
| 2013/0013606 | A1* | 1/2013 | Stanfill | G06F 17/30297 707/737 |
| 2013/0060783 | A1* | 3/2013 | Baum et al. | 707/746 |
| 2013/0254212 | A1* | 9/2013 | Rao | G06F 17/30625 707/746 |
| 2013/0311830 | A1* | 11/2013 | Wei | G06F 11/3684 714/32 |
| 2014/0019088 | A1* | 1/2014 | Leonard | G06F 17/18 702/178 |
| 2014/0297685 | A1* | 10/2014 | Nojima | G06F 17/30312 707/769 |

FOREIGN PATENT DOCUMENTS

| | | |
|---|---|---|
| JP | 2001243236 A | 9/2001 |
| JP | 2005063385 A | 3/2005 |

* cited by examiner

FIG. 2

300 TIME-SERIES DATA

| 311 | 312 | 313 (313a, 313b, 313c, 313d) |
|---|---|---|
| GAS ENGINE 1, | 2010-01-10 07:00:00, | 15.2, 60, 1510, 200  — 301 |
| GAS ENGINE 1, | 2010-01-10 07:00:01, | 15.1, 60, 1515, 195 |
| GAS ENGINE 1, | 2010-01-10 07:00:02, | 13.2, 61, 1517, 197 |
| GAS ENGINE 1, | 2010-01-10 07:00:03, | 13.7, 63, 1520, 193 |
| GAS ENGINE 1, | 2010-01-10 07:00:04, | 13.1, 62, 1521, 194 |
| GAS ENGINE 1, | 2010-01-10 07:00:05, | 14.0, 60, 1513, 195 |

FIG. 3

600 SEARCH QUERY

- 610 — select_range : 5 seconds
- 620 — select_items : GAS ENGINE 1. PRESSURE
- 630 — where_timerange : 2010-01-07 07:00:00, 2010-01-10 12:00:00
- 640 — where_condition : AVG( GAS ENGINE 1. PRESSURE ) >1500

FIG. 4

141 SCHEMA DEFINITION TABLE

| 700 DATA SOURCE NAME | 701 ATTRIBUTE NAME |
|---|---|
| GAS ENGINE 1 | WATER TEMPERATURE |
| | TEMPERATURE |
| | PRESSURE |
| | THE NUMBER OF REVOLUTIONS |
| CONVEYANCE DEVICE 1 | POWER VALUE |
| | CURRENT VALUE |

FIG. 5

210 TIME-SERIES DATA TABLE

| ID | DATA SOURCE NAME | ATTRIBUTE NAME | TIME STAMP | SENSOR VALUE |
|---|---|---|---|---|
| 00000000 | GAS ENGINE 1 | PRESSURE | 2010-01-10 07:00:00 | 1518 |
| 00000001 | GAS ENGINE 1 | WATER TEMPERATURE | 2010-01-10 07:00:01 | 1527 |
| 00000002 | GAS ENGINE 1 | PRESSURE | 2010-01-10 07:00:01 | 1532 |
| ... | ... | ... | ... | ... |
| 00011200 | GAS ENGINE 1 | PRESSURE | 2010-01-10 10:06:10 | 1421 |
| ... | ... | ... | ... | ... |

FIG. 6

142 INDEX GENERATION TABLE

| DATA SOURCE NAME | ATTRIBUTE NAME | DIVISION REGULAR TIME INTERVAL | FEATURE VALUE CALCULATION FUNCTION |
|---|---|---|---|
| GAS ENGINE 1 | WATER TEMPERATURE | 1 HOUR, 30 MINUTES, 10 MINUTES | MAX, MIN |
| | TEMPERATURE | 1 HOUR, 30 MINUTES, 1 MINUTE | MAX, MIN |
| | PRESSURE | 10 MINUTES, 5 MINUTES | MAX, MIN |
| | THE NUMBER OF REVOLUTIONS | 10 MINUTES, 3 MINUTES, 1 SECOND | MAX, MIN |
| CONVEYANCE DEVICE 1 | POWER VALUE | 5 MINUTES, 1 SECOND | MAX, MIN |
| | CURRENT VALUE | 20 SECONDS, 10 SECONDS, 1 SECOND | MAX, MIN |

FIG. 7
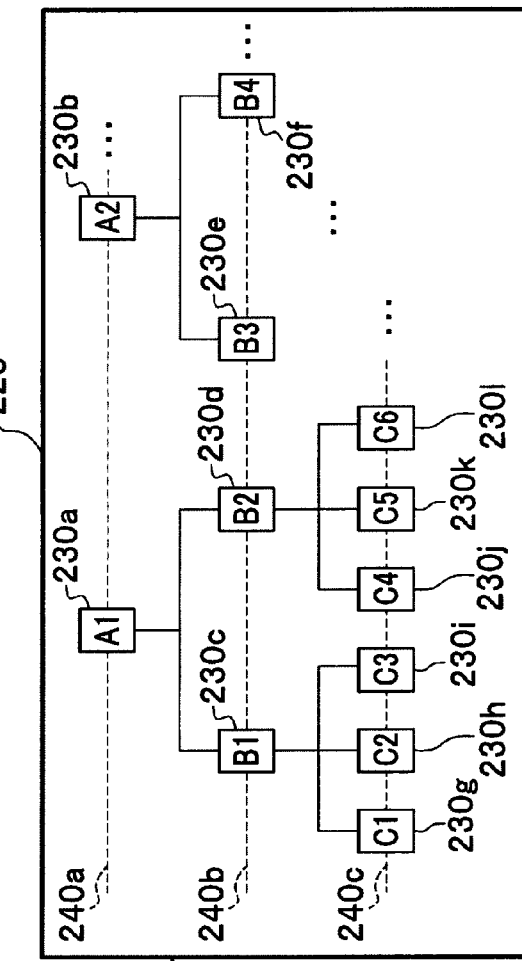
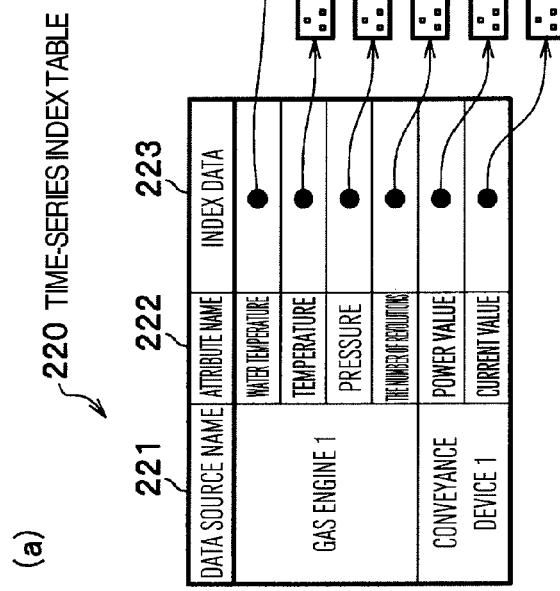
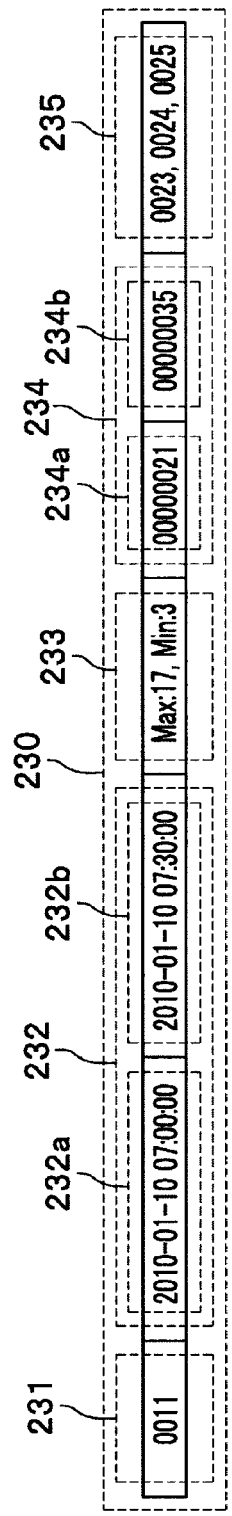
(a)
(b) DATA STRUCTURE OF TIME-SERIES INDEX NODE

FIG. 8

143 EVALUATION FORMULA GENERATION RULE TABLE

| RULE ID (721) | SEARCH CONDITION PATTERN (722) | EVALUATION FORMULA (723) |
|---|---|---|
| 01 | ~(AVG\|MIN\|MAX) .*> (¥d+) | F_MIN > $2 ;<br>F_MIN < $2 < F_MAX ; |
| 02 | ~(AVG\|MIN\|MAX) .*< (¥d+) | F_MAX < $2 ;<br>F_MIN < $2 < F_MAX ; |
| 03 | ~(AVG\|MIN\|MAX) .* = (¥d+) | F_MIN < $2 < F_MAX ; |
| 04 | ~(AVG\|MIN\|MAX) .*!= (¥d+) | $2 > F_MAX ;<br>$2 < F_MIN ; |
| 05 | ~(SUM) .* > (¥d+) | F_MIN > $2 ;<br>F_MIN < $2 < F_SUM ; |
| 06 | ~(SUM) .* < (¥d+) | F_SUM < $2 ;<br>F_MIN < $2 < F_SUM ; |
| 07 | ~(SUM) .*= (¥d+) | F_MIN < $2 < F_SUM ; |
| 08 | ~(SUM) .* != (¥d+) | $2 > F_SUM ;<br>$2 < F_MIN ; |
| ... | ... | ... |

FIG. 20
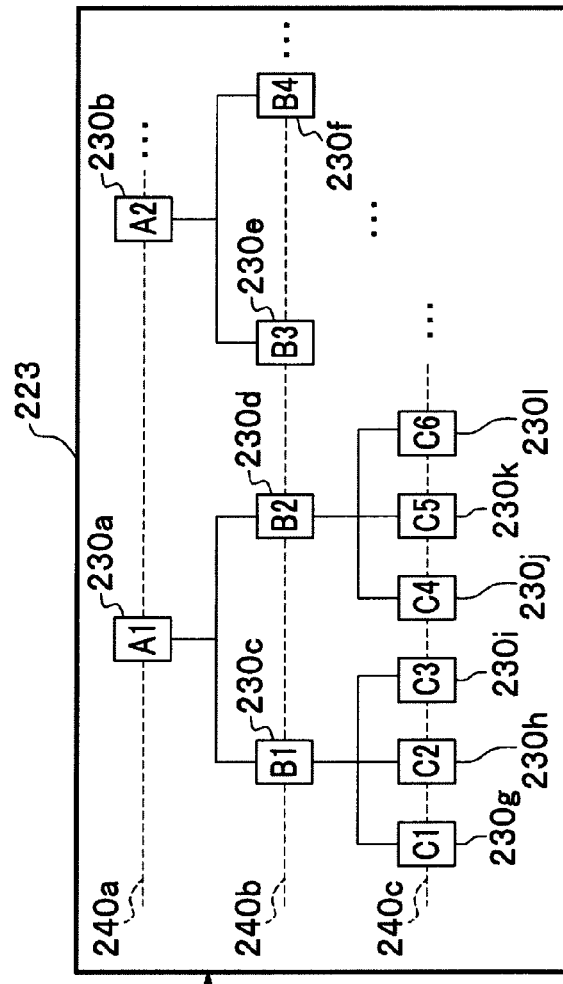
(a) 220A TIME-SERIES INDEX TABLE
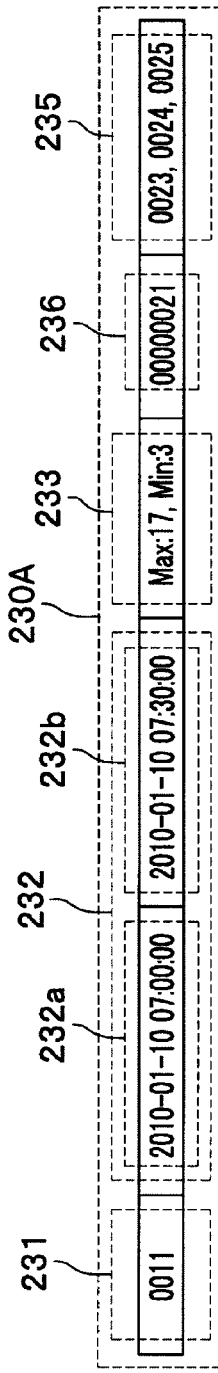
(b) DATA STRUCTURE OF TIME-SERIES INDEX NODE

FIG. 33

144 INDEX GENERATION TABLE

| DATA SOURCE NAME | ATTRIBUTE NAME | DIVISION REGULAR TIME INTERVAL | FEATURE VALUE CALCULATION FUNCTION | GENERATION DESTINATION DEVICE ADDRESS |
|---|---|---|---|---|
| GAS ENGINE 1 | WATER TEMPERATURE | 1 HOUR, 30 MINUTES, 10 MINUTES | MAX, MIN | 192.168.10.3 |
| | | 1 MINUTE, 30 SECONDS, 10 SECONDS | AVG | 192.168.10.2 |
| | PRESSURE | 10 MINUTES, 5 MINUTES | MAX, MIN | 192.168.10.1, 192.168.10.2 |
| | THE NUMBER OF REVOLUTIONS | 10 MINUTES, 3 MINUTES, 1 SECOND | MAX, MIN | 192.168.10.4 |
| CONVEYANCE DEVICE 1 | POWER VALUE | 5 MINUTES, 1 SECOND | MAX, MIN | 192.168.10.5 |
| | CURRENT VALUE | 20 SECONDS, 10 SECONDS, 1 SECOND | MAX, MIN | 192.168.10.3 |

710 711 712 713 714

TIME-SERIES DATA MANAGEMENT DEVICE, SYSTEM, METHOD, AND PROGRAM

TECHNICAL FIELD

The present invention relates to a time-series data management device, a time-series data management system, a time-series data management method, and a time-series data management program for managing time-series data which is generated continuously with elapse of time. In particular, the present invention relates to a technique for searching accumulated time-series data for a desired search pattern fast.

BACKGROUND ART

With the advancement of the sensing technology such as the RFID (Radio Frequency Identification) and GPS (Global Positioning System), it becomes possible to acquire various sensor data from the actual world such as factories and offices, and cases where the sensor data are utilized in business are increasing. For example, applied cases, such as the "smart grid" in which "power usage values" are acquired from homes by using meter inspection devise and a required power value in the future is predicted and analyzed on the basis of the situation of use to control a power generation value optimally, "traffic situation prediction" in which "position information" of vehicles on roads is acquired by using the GPS and traffic situations such as a traffic jam are predicted by analyzing speeds and directions of the vehicles, and "preventive device maintenance" in which "running information" such as the number of motor rotations and pressures is acquired from plant devices and facilities in a factory or the like and an abnormality or a failure of a device is previously detected on the basis of their values and variations are being brought into a practical use stage.

For making the most of the sensor data, it is indispensable to analyze the data and understand its operation characteristics. It can be mentioned as a feature that the sensor data is the so-called "time-series data" which is generated continuously with the elapse of time. For understanding the operation characteristics, it is important to find data variations and a pattern along time. As a result, it becomes possible to make the most of the sensor data in business by utilizing features and tendencies of devices and facilities acquired from the sensor devices.

In the analysis of time-series data, a method of "accumulating" data and "searching for" various patterns in the accumulated data through trial and error is taken. An example of time-series data search will now be described specifically by taking evidence management in physical distribution industry as an example.

In recent years, cases where a sophisticated transportation business utilizing sensor data is developed have increased in the physical distribution industry. As one example of them, there is a service which certifies that a load demanded to be transported stably, such as medical cells or medicines, are not transported roughly.

An impact meter is attached to each load. Sensor data acquired every moment are accumulated in a storage device such as a hard disk upon occasion. In order to certify stable transportation, various searches are conducted on the accumulated data. For example, a search pattern represented as "extract a series in which the impact degree of a sensor indicating a value of at least 20 is generated continuously over at least five seconds" out of data "during three past months" is specified. Unless this series is not extracted, it is certified that stable transportation has been conducted.

A difference between the above-described search in time-series data and search in conventional relational database will now be described. In the search in the conventional relational database, individual data such as, for example, "name" or "address" has meaning. And a feature of the search is that data which matches a condition is taken out from data of simple substance one by one.

On the other hand, in the time-series data, values of individual sensor values are also important. However, a shift of the sensor value led out from the data series becomes more important. In search as well, therefore, it becomes important to extract a data series which matches a specific search pattern (referred to as series pattern as well).

As a method for implementing such a time series data search, a method utilizing time-series analysis processing using a stream data processing system proposed in an academic society relating to databases is conceivable (for example, Non Patent Literature 1).

CITATION LIST

Patent Literature

Patent literature 1: JP-A-2005-63385

Non Patent Literature

Non Patent literature 1: B. Balcock, S. Babu, M. Datar, R. Motwani and J. Widom, "Models and issues in data stream systems," In Proc. Of PODS 2002, pp. 1-16 (2002)

SUMMARY OF INVENTION

Technical Problem

The stream data processing is used for applications as real time analysis in many cases. However, the stream data processing is also utilized for batch applications, i.e., utilized as analysis processing for accumulated data in many cases. In time-series analysis processing in such applications, all accumulated time-series data are loaded onto a memory and collation with a specified series pattern is executed successively along the time. Since such processing needs scan for all time-series data, however, it is necessary to load all time-series data which become an object of search from a disk onto the memory.

In general, sensor data generated in the actual world often become an enormous volume. In the conventional method, therefore, there is a problem that the search performance is degraded by frequent occurrence of disk I/O (Input/Output) at the time of disk reading.

Furthermore, a technique of implementing a similarity search for a specific pattern on past time-series data fast is disclosed in Patent Document 1. In the scheme, conventional similarity operation is made faster by previously conducting quantization operation on all time-series data and conducting a similarity calculation utilizing quantization at the time of search. In the present scheme as well, however, it is necessary to load all time-series data which become an object of operation from a disk and consequently the problem of the performance degradation caused by the frequent occurrence of the disk I/O cannot be solved.

The present invention has been made to solve the problem. An object of the present invention is to provide a time-series data management device, a time-series data management system, a time-series data management method, and a time-series data management program capable of searching accumulated time-series data for a desired search pattern fast.

Solution to Problem

In order to solve the problem, a time-series data management device according to the present invention includes a data accumulation unit and a data search unit. When accumulating time-series data, the data accumulation unit creates a time-series index having a feature value of a data series calculated every specific time period. And when searching time-series data, the data search unit converts a specified search condition to an evaluation formula for evaluating a feature value included in the time-series index, makes a decision as to a feature value of every time period included in the time-series index by using the evaluation formula, identifies a complying time period of a data series group, reads a data series group in the identified time period from a disk (for example, an external storage device 200), and performs a time-series analysis on only the data series which is read. When performing a time-series analysis on the time data series stored on the disk, it is possible to filter time-series data having a possibility of matching a specified search pattern and read the filtered time-series data from the disk.

Advantageous Effects of Invention

According to the present invention, it is possible to search accumulated time-series data for a desired search patter fast.

BRIEF DESCRIPTION OF DRAWINGS

FIG. 2 is a diagram exemplifying a data structure of time-series data;

FIG. 3 is a diagram exemplifying a description form of a search query;

FIG. 4 is a diagram exemplifying a schema definition table;

FIG. 5 is a diagram exemplifying a time-series data table;

FIG. 6 is a diagram exemplifying an index generation table;

FIG. 7 is a diagram exemplifying data structures of a time-series index table and a time-series index node;

FIG. 8 is a diagram exemplifying an evaluation formula generation rule table;

FIG. 20 is a diagram exemplifying data structures of a time-series index table and a time-series index node according to the second embodiment;

FIG. 33 is a diagram exemplifying an index generation table according to the fourth embodiment;

DESCRIPTION OF EMBODIMENTS

Hereafter, embodiments of the present invention will be described in detail with reference to the drawings.

First Embodiment

Figure 1:
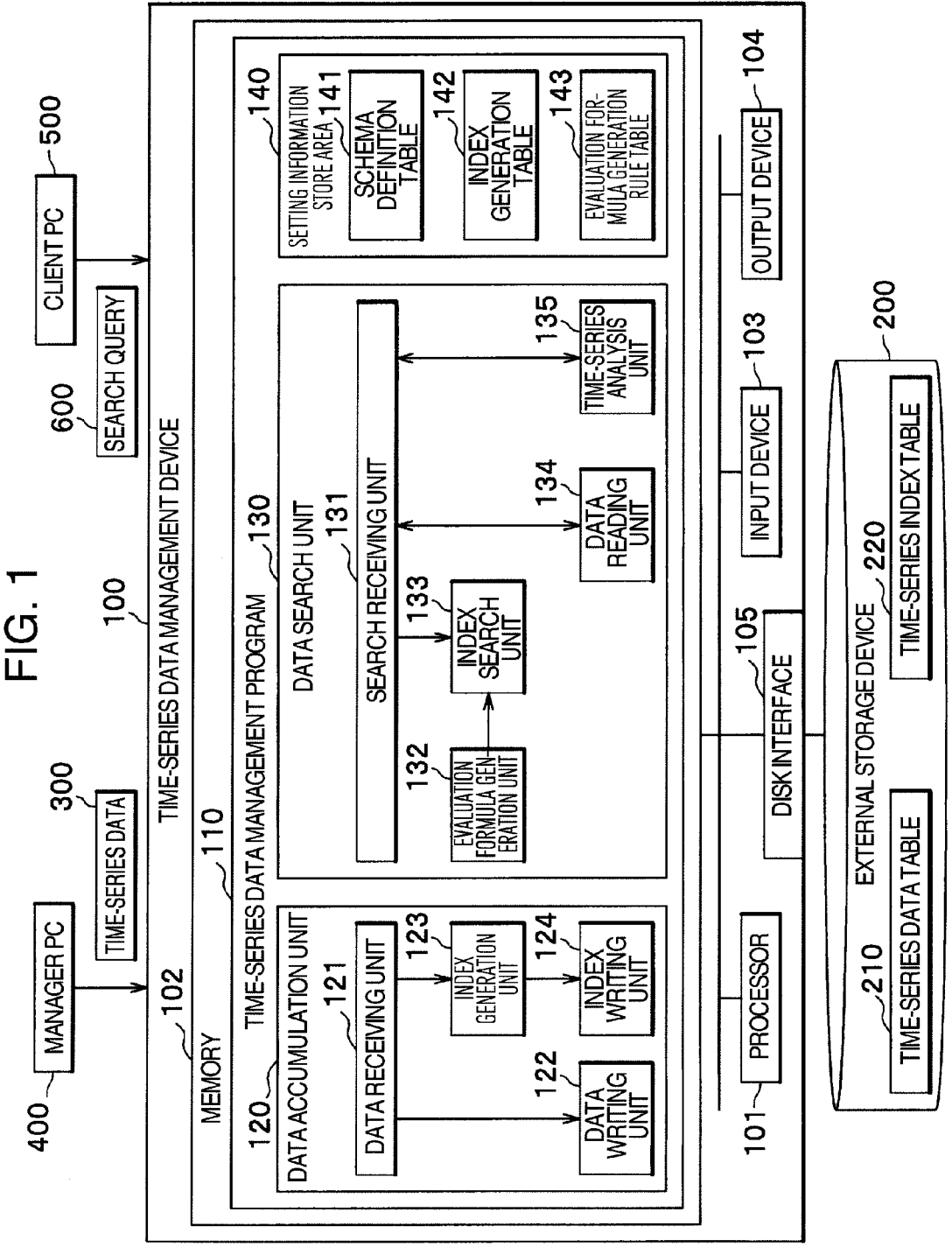
FIG. 1 is a diagram exemplifying a general configuration of a system according to a first embodiment of the present invention.

FIG. 1 is a diagram exemplifying a general configuration of a system according to a first embodiment of the present invention. The system according to the present embodiment is configured to include a time-series data management device 100, an external storage device 200 connected to the time-series data management device 100, a manager PC 400 which transmits time-series data 300 (see FIG. 2) to the time-series data management device 100, and a client PC 500 which transmits a search query 600 (see FIG. 3) to the time-series data management device 100. By the way, PC is an abbreviation of "Personal Computer." The search query 600 is a processing request (query) represented as a character string, and it is used to issue an instruction to search the time series data 300 to the system.

The time-series data management device 100 is a device which accumulates and searches the time-series data 300. The external storage device 200 is a storage device in which a time-series data table 210 (time-series data information) (see FIG. 5) and a time-series index table 220 (time-series index information) (see FIG. 7) are stored. The external storage device 200 is composed of, for example, a HDD (Hard Disk Drive).

The time-series data 300 is a set of sensor data. Individual sensor data generated with elapse of time are disposed in order of time as a series. The sensor data is measured data which is acquired from a sensing device, a facility/device or the like. The sensor data includes running information such as, for example, the number of revolutions or pressure, a physical value such as temperature and humidity, and a time stamp which represents their occurrence time.

The present embodiment will be described supposing that the sensor data are various measured data occurring in the actual world. In the present invention, however, the sensor data are not restricted to them as long as the data are data including a physical value. For example, stock price data occurring outside the actual world can become an object of the present invention.

The manager PC 400 is a terminal of an operation manager who instructs the time-series data management device 100 to store the time-series data 300 and conducts various kinds of setting concerning data management. The client PC 500 is a terminal of a user who executes search the time-series data management device 100. The client PC 500 transmits the search query 600 which represents a search request and receives a search result. Although not illustrated, each of the manager PC 400 and the client PC 500 includes a processor, a memory, an input device, and an output device including a display unit.

Components of the time-series data management device 100 will now be described.

The time-series data management device 100 includes a processor 101, a memory 102, an input device 103, and an output device 104. The time-series data management device 100 is connected to the external storage device 200 via a disk interface 105.

The processor 101 is composed of, for example, a CPU (Central Processing Unit). The processor 101 executes a time-series data management program 110 which is read onto the memory 102, and thereby executes various kinds of processing of the program.

The various kinds of processing of the time-series data management program 110 are implemented by execution of them in the processor 101. However, they can also be implemented as hardware by forming processing units which conduct various kinds of processing such as a data accumulation unit 120 and a data search unit 130 as integrated circuits. In the ensuing description of the present embodiment, each of the processing units implemented by execution of various programs in the processor 101 is regarded as a subject of each processing. In the case where processing units are implemented as hardware, however, the processing units conduct processing as subjects.

The memory 102 is composed of a storage medium such as, for example, a RAM (Random Access Memory) and a flash memory. The input device 103 is composed of devices such as, for example, a keyboard and a mouse. The output device 104 is composed of a device such as, for example, a liquid crystal monitor.

Components of the time-series data management program 110 will now be described.

The time-series data management program 110 is composed of the data accumulation unit 120, the data search unit 130, and a setting information store area 140.

The data accumulation unit 120 executes processing of receiving the time-series data 300 and writing the data onto a disk in the external storage device 200 as the time-series data table 210, and processing of creating index information for filtering a data series which is read from a disk when searching data and writing the information as the time-series index table 220.

The data accumulation unit 120 is composed of a data receiving unit 121, a data writing unit 122, an index generation unit 123, and an index writing unit 124.

The data receiving unit 121 receives the time-series data 300 from the manager PC 400, and delivers the data to the data writing unit 122 and the index generation unit 123. By the way, when the data receiving unit 121 delivers data, it is also possible to work data to forms which facilitate processing in the data writing unit 122 and the index generation unit 123. It is supposed in the description of the present embodiment that the work processing is conducted.

The data writing unit 122 conducts processing of receiving worked time-series data from the data receiving unit 121 and writing the worked time-series data into the time-series data table 210.

The index generation unit 123 conducts processing of receiving the worked time-series data from the data receiving unit 121 and generating the time-series index table 220 having time-series indexes. The time-series index is index information for filtering only a data series having a possibility of matching in a time-series analysis from the time-series data table 210 and reading the data series when searching data. As a result, it is possible to omit reading data series which cannot match in time-series analysis processing and it becomes possible to prevent the search performance from being degraded by frequent occurrence of the disk I/O. By the way, in description of the present embodiment, "data series" is defined as time-series data in a specific regular time interval included in the time-series data 300.

The time-series indexes retain various feature values calculated every time period obtained by dividing the time series data 300 at specific time intervals. The feature value is a numerical value representing a tendency or a state of time-series data in a specific regular time interval, and is calculated as a set operation of sensor data values belonging to each data series. For example, an arbitrary set operation such as a maximum value/minimum value or average/variance can be applied to the present invention. In addition, a combination of feature values may be applied as a new feature value. For example, it is also possible to use "upper and lower limits" of a sensor value in series data as feature values by using a "maximum value" and a "minimum value."

The index writing unit 124 executes processing of receiving a time series index generated by the index generation unit 123 and writing the time series index into the time series index table 220.

The data search unit 130 conducts processing of extracting a data series matching a desired search pattern from the time series data table 210 in response to a search request from the client PC 500. The data search unit 130 is composed of a search receiving unit 131, an evaluation formula generation unit 132, an index search unit 133, a data reading unit 134, and a time-series analysis unit 135.

In the present embodiment, the data reading unit 134 reads time-series data from the time-series data table 210 onto the memory 102, and the time-series analysis unit 135 conducts collation processing of the data with the search query 600. However, a feature of the present embodiment is that the index search unit 133 refers to the time-series index in the time-series index table 220 and filters a data series having a possibility of matching in the time-series analysis processing, before reading time-series data from the time-series data table 210.

Hereafter, the processing units will be described in more detail.

The search receiving unit 131 plays a role as an interface layer for the client PC 500. The search receiving unit 131 executes processing of receiving the search query 600 from the client PC 500, receiving a search result from the time-series analysis unit 135, and returning the result to the client PC 500. After receiving the search query 600, the search receiving unit 131 calls the index search unit 133 and the data reading unit 134 at suitable timing. Details thereof will be described later.

The evaluation formula generation unit 132 executes processing of generating an evaluation formula on the basis of the search query 600. The evaluation formula is a formula for making a decision as to a compliance degree of each feature value of the time-series index with the search query 600. In this compliance degree decision, the evaluation formula generation unit 132 identifies a complying data series and reads the data series from the time-series data table 210.

For example, in the case where the feature value has a value obtained by combining "maximum" with "minimum," i.e., has an upper limit and a lower limit of series data in a specific regular time interval, the search query 600 is converted to a formula for evaluating the upper limit and lower limit. For example, in the case where a search pattern represented as "extract a series in which a value of at least 10 continues over at least five seconds" is specified, the search pattern is converted to a formula that "the minimum value is at least 5" which means at least 5 seconds. Series data complying with the present formula is a series having a possibility of matching in the time-series analysis. Conversely, series data which does not comply with the present formula never matches in the time-series analysis and consequently the series data does not become an object of reading.

The index search unit 133 conducts processing of receiving the evaluation formula from the evaluation formula generation unit 132 and making a decision as to a compliance degree with a feature value of every time period obtained by dividing by a specific regular time interval, out of the time series index. The index search unit 133 extracts pointer information of the data series in the complying time period, and outputs the pointer information to the data reading unit 134.

The data reading unit reads a data series indicated by the pointer from the time-series data table 210 on the basis of the pointer information, and outputs the data series to the time-series analysis unit 135.

The time-series analysis unit 135 reads the data series, conducts collation processing with the search query 600 on the memory, extracts a data series which completely matches the search query 600, and outputs the data series to the search receiving unit 131. As a favorable example of processing conducted by the time-series analysis unit 135, there is stream data processing described in Non Patent Document 1. In the example of the present embodiment, the time-series analysis unit 135 will be described on the basis of the stream data processing. However, the processing conducted by the time-series analysis unit 135 is not restricted to the stream data processing as long as the processing is processing capable of collating a data series with the search query 600.

The setting information store area 140 is composed of a schema definition table 141 (schema definition information) (see FIG. 4), an index generation table 142 (index generation information) (see FIG. 6), and an evaluation formula generation rule table 143 (evaluation formula generation rule information) (see FIG. 8) which are various kinds of setting information for managing the time-series data. The schema definition table 141 is definition information which describes structures of respective sensor data included in the time-series data 330. In the index generation table 142, various kinds of setting information for generating time-series indexes are defined. The index generation table 142 is referred to by the index generation unit 123. In the evaluation formula generation rule table 143, conversion rules for converting the search query 600 to evaluation formulas are defined. The evaluation formula generation rule table 143 is referred to by the evaluation formula generation unit 132.

Components of the external storage device 200 will now be described.

The time-series data table 210 is an area for accumulating the time-series data 300, and is, for example, a table of a relational database. The time-series index table 220 is a table for accumulating the time-series index, and is, for example, a table of a relational database.

FIG. 2 is a diagram exemplifying a data structure of the time-series data 300. The time-series data 300 is a set of sensor data 301, and sensor data 301 are disposed in a time series. The sensor data 301 is data generated by a data source and it can be regarded as data at a specific moment in the time-series data. The sensor data 301 is composed of a data source name 311, a time stamp 312, and a sensor value 313 (313*a*, 313*b*, 313*c* and 313*d*).

The data source name 311 is an identifier for identifying a data source which is a generation source of the sensor data 301. In the present embodiment, the data source name 311 is handled as a character string which indicates a name of the data source. However, the data source name 311 is not restricted to a character string which indicates a name of the data source, as long as the data source name 311 identifies the data source. For example, a numerical value such as an ID number can also be applied to the present invention.

The time stamp 312 represents time when each sensor data has occurred. In the present embodiment, the time is represented by "the Christian Era (four digits)-month-day-hour:minute: second." However, the time stamp is not restricted to the representation as long as time can be recognized, but any time form can be applied.

The sensor value 313 is a measured value of sensor data, and is composed of a single physical value or a plurality of physical values. In the ensuing description of the present embodiment, it is supposed that a plurality of sensor values exist in one sensor data. However, it is also possible that a single sensor value exists for one sensor data. The reason why a plurality of sensor values exist is that a plurality of measured values such as, for example, physical data "the number of revolutions" and "pressure" are acquired at the same time in some cases.

In the ensuing description of the present embodiment, it is supposed that the time-series data 300 is described in the CSV (Comma-Separated Values) text form as shown in FIG. 2 and the time-series data 300 is input to the data receiving unit 121 in the time-series data management device 100. However, the form of the time-series data 300 is not restricted to it as long as the time-series data 300 is represented as a set of sensor data and the data receiving unit 121 can interpret it. For example, a form in which the time-series data 300 is represented in a binary form and is input to the data receiving unit 121 can also be applied to the present invention.

The time-series data 300 is input to the time-series data management device 100. In the ensuing description of the present embodiment, it is supposed that the time-series data 300 is input to the time-series data management device 100 from the manager PC 400 manually by using a dedicated command. For example, however, a method of conducting network communication between a remote host and the time-series data management device 100 via a communication path such as a LAN (Local Area Network) to input the time-series data is also possible.

FIG. 3 is a diagram showing an example of a description form of the search query 600. The search query 600 is composed of a search range interval 610 which is a "select_range" phrase, a search item 620 which is a "select_items" phrase, a search object range 630 which is a "where_timerange" phrase, and a search condition 640 which is a "where_condition" phrase.

A regular time interval of the data series is specified in the search range interval 610. A data source which outputs the data series and a sensor value are specified in the search item 620. As a feature of the time-series search, specification conducted by combining the search object range 630 with a data pattern (variation pattern) specified in the search condition 640 is typical. By the way, the data pattern (variation pattern) is a pattern which indicates a variation of the data series desired to be extracted, and the data pattern is composed of a regular time interval of the data series and a condition formula.

The search object range 630 indicates a specific time period specified as a search object by the user, and it is specified by a search object range. In the example shown in FIG. 3, a time period ranging from 0 second 0 minute 7 o'clock, Jan. 7, 2010 to 0 second 0 minute, 12 o'clock, Jan. 10, 2010 is set as the search range, and time-series data in the section is read from a disk in the external storage device 200 and set as the object of the time-series analysis processing.

In the example of the search condition 640 shown in FIG. 3, it is indicated to "extract series data having an average value (AVG) of a pressure of a gas engine 1 over a period of 5 seconds exceeding 1,500" on the basis of the search range interval 610.

A data pattern described by the search condition 640 is composed of an aggregation function formula and a condition decision formula. The aggregation function formula is an operation intended for all sensor values existing in the search range interval, and an arbitrary formula such as, for example, an average value (AVG), a maximum value (Max), a minimum value (Min), and a sum (Sum), can be used. The condition decision formula is a relational operator for making a decision as to an operation result led by the aggregation function formula, and an arbitrary operator, such as, for example, an inequality operator ($<$, $>$, $\leq$, $\geq$) or an equality operator ($=$) can be used.

To sum up, the example shown in FIG. 3 means "extract series data having an average value of the pressure value of the gas engine 1 over 5 seconds exceeding 1,500 in a time period ranging from 0 second 0 minute 7 o'clock, Jan. 7, 2010 to 0 second 0 minute, 12 o'clock, Jan. 10, 2010 (2010-01-07 07:00:00, 2010-01-10 12:00:00), and output the gas engine 1 and the pressure."

In the description of the present embodiment, it is supposed that the search condition 640 is described in the above-described form. However, the present invention is not restricted to the form as long as a form can represent a variation and state pattern of the sensor value.

FIG. 4 is a diagram exemplifying the schema definition table 141. An example of the schema definition table 141 (schema definition information) which is a data form of the time-series data 300 will now be described with reference to FIG. 4. A data source name 700 is an identifier for identifying a data source which becomes a generation source of sensor data, and a name of the data source is used here. As for an attribute name 701, a classification name of a sensor value of sensor data generated from each data source is stored. An item corresponding to an nth row of the attribute name 701 corresponding to each item in the data source name 700 corresponds to an nth column of the sensor value 313 in the sensor data 301. For example, in the example shown in FIGS. 2 and 3, 313a corresponds to "water temperature," 313b correspond to "temperature," 313c corresponds to "pressure," and 313d corresponds to "the number of revolutions."

After receiving the time-series data 300, the data receiving unit 121 refers to the schema definition table 141 when conducting work processing to decompose each sensor data every attribute.

FIG. 5 is a diagram exemplifying the time-series data table 210. An example of the time-series data table 210 (time-series data information) will now be described with reference to FIG. 5 and with reference to FIG. 1 as the occasion may demand. The time-series data table 210 is a table for accumulating the time-series data 300, and is composed of an ID 211, a data source name 212, an attribute name 213, a time stamp 214, and a sensor value 215.

The ID 211 is an identification number for identifying each row, and one specific sensor value of sensor data generated at each time is stored in each row. The data source name 212 is an identifier for identifying a data source which becomes a generation source of sensor data. For example, a name of the data source is stored in the data source name 212. A classification name of a sensor value of sensor data generated from the data source is stored in the attribute name 213. Time when sensor data is generated is entered to the time stamp 214. Numerical value data which is a sensor value is stored in the sensor value 215.

As described above, the data writing unit 122 receives each worked sensor data from the data receiving unit 121, and writes the data into the time-series data table 210. By the way, in the present embodiment, a plurality of attributes are stored mixedly into one time-series data table 210. However, a method of dividing the table every attribute is also possible.

Furthermore, in the description of the time-series data, it is supposed that the time-series data is stored on the RDB (relational database). However, a scheme of storing the time-series data directly on, for example, a file system can also be applied to the present invention.

FIG. 6 is a diagram exemplifying the index generation table 142. The index generation table 142 is definition information needed when generating a time-series index, and is composed of a data source name 710, an attribute name 711, a division regular time interval 712, and a feature value calculation function 713. By the way, the time-series index has a data structure obtained by dividing time-series data every specific regular time interval and providing each time period with a feature value, although details will be described later.

The data source name 710 is an identifier for identifying a data source which becomes a generation source of sensor data. A sensor classification name of a sensor value is stored in the attribute name 711. A single regular time interval for division or a plurality of regular time intervals are stored in the division regular time interval 712. An aggregation function used as a feature value is stored in the feature value calculation function 713.

For example, in the case where the data source name 710 is "gas engine 1" and the attribute name 711 is "water temperature" in FIG. 6, the division regular time interval 712 is set equal to one hour, 30 minutes, and 10 minutes, and a feature value obtained when the time period is divided by each regular time interval is calculated.

For example, in the case where the whole time period of time-series data is "10:00-12:00," a maximum value and a minimum value are included in the time-series index in the present example as feature values in "10:00-11:00" and "11:00-12:00" obtained by dividing the whole time period to one hour intervals, feature values in "10:00-10:30," "10:30-11:00," "11:00-11:30" and "11:30-12:00" obtained by dividing the whole time period to 30 minute intervals, and feature values in "10:00-10:10," "10:10-10:20," . . . , "11:50-12:00" obtained by dividing the whole time period to 10 minute intervals.

The reason why the feature value is retained every different division regular time interval will now be described. If the division regular time interval is remarkably different from the search range interval, a high precision compliance degree decision cannot be made. Therefore, a feature value is previously calculated every different division regular time interval. And a division regular time interval having a value close to the search range interval is selected when making a decision as to compliance.

The case where a high precision compliance decision cannot be made is, for example, the case where "division regular time interval>>search range interval." Even if the feature value complies with the evaluation formula, it is compliance only in a local range. Therefore, the possibility of not matching in ranges other than the local range in the time-series analysis processing becomes high. In other words, wasteful reading of time-series data occurs.

In evaluating the feature value in the division regular time interval, there are the case where the relation "division regular time interval>search range interval" is satisfied and the case where the relation "division regular time interval<search range interval" is satisfied. The latter case is a method of linking feature values in regular time intervals which are adjacent to each other and thereby calculating a feature value corresponding to a plurality of division regular time intervals and making a decision as to the feature value according to the evaluation formula. Details thereof will be described later. Here, the former method will be described.

If a node having a division regular time interval which assumes a value close to the search range interval as far as possible while satisfying the relation "division regular time interval>search range interval" can be extracted, then it is possible to prevent wasteful data reading to the utmost.

For example, in the case where the division regular time interval of index data 223 (see FIG. 7) has three hierarchy levels: one hour, 30 minutes, and 10 minutes and the search range interval is 20 minutes, it is desirable to extract nodes having the division regular time interval of 30 minutes.

FIG. 7 is a diagram exemplifying data structures of a time-series index table and a time-series index node. The time-series index table 220 (time-series index information) shown in FIG. 7(a) has index data 223 which retains a feature value in each time period, every attribute name 222 of a data source 221. The index data 223 is composed of a plurality of nodes of time-series index (time-series index nodes), and has a tree structure of indexes (index tree).

For example, in FIG. 7(a), a time-series index node 230a is a node which is one hour in range interval and which retains various feature values, for example, a maximum value and a minimum value in a time period ranging from 0 second 0 minute 7 o'clock, Jan. 10, 2010 to 0 second 0 minute, 8 o'clock, Jan. 10, 2010. A time-series index node 230b is a node which is hour in range interval in the same way and which retains various feature values in a time period ranging from 0 second 0 minute 8 o'clock, Jan. 10, 2010 to 0 second 0 minute, 9 o'clock, Jan. 10, 2010.

As a feature of the present embodiment, the index data 223 can retain nodes having different regular time intervals hierarchically. In an example shown in FIG. 7a, a node set 240a is a set of nodes having a regular time interval of one hour, and a node set 240b is a set of nodes having a regular time interval which is shorter than that of higher order nodes, and which is, for example, 30 minutes. A node set 240c is a set of nodes having a regular time interval which is shorter than that of higher order nodes, and which is, for example, 10 minutes.

Each node has a time period, specifically start time and end time of a range interval. In the case where a time period of a low-order node is included in a time period of a high-order node, the high-order node retains pointer information to the low-order node. For example, a time-series index node 230c is a node having a feature value in a time period ranging from 0 second 0 minute 7 o'clock, Jan. 10, 2010 to 0 second 30 minutes, 7 o'clock, Jan. 10, 2010. A time-series index node 230d is a node having a feature value in a time period ranging from 0 second 30 minutes 7 o'clock, Jan. 10, 2010 to 0 second 0 minute, 8 o'clock, Jan. 10, 2010. In the same way, a time-series index node 230g is a node having a feature value in a time period ranging from 0 second 0 minute 7 o'clock, Jan. 10, 2010 to 0 second 10 minutes, 7 o'clock, Jan. 10, 2010. A time-series index node 230h is a node having a feature value in a time period ranging from 0 second 10 minutes 7 o'clock, Jan. 10, 2010 to 0 second 20 minutes, 7 o'clock, Jan. 10, 2010. A time-series index node 230i is a node having a feature value in a time period ranging from 0 second 20 minutes 7 o'clock, Jan. 10, 2010 to 0 second 30 minutes, 7 o'clock, Jan. 10, 2010.

FIG. 7(b) is a diagram showing an example of a data structure of a time-series index node. An ID 231 in a time-series index node 230 is an identifier for identifying the node. A number unique to the node is assigned by the index generation unit 123. A time period 232 is a time period of the node, and the time period 232 includes start time 232a and end time 232b. A feature value 233 is a single or a plurality of feature value(s).

A pointer 234 stores information of a pointer to sensor data in the time-series data table 210. A pointer 234a is a pointer of start time of time-series data, i.e., sensor data having start time. A pointer 234b is a pointer of end time of time-series data, i.e., sensor data having end time.

In the description of the present embodiment, it is supposed that the ID 211 shown in FIG. 5 is utilized. However, a physical address in the external storage device 200 storing sensor data can also be utilized. A subordinate node pointer 235 stores a pointer array to subordinate nodes. For example, in the subordinate node pointer 235 of the time-series index node 230c shown in FIG. 7(a), the IDs 231 of the time-series index nodes 230g, 230h and 230i which are subordinate nodes linked to the node 230c are stored.

In the present embodiment, the ID 231 of each node is used as the subsequent node pointer 235. For example, however, a physical address in the external storage device 200 in which each node is stored can also be utilized. By the way, as for a data form of the index data 223, an arbitrary form such as the binary form or the XML (Extensible Markup Language) form can be used as long as it can represent the index data 223.

FIG. 8 is a diagram exemplifying the evaluation formula generation rule table 143. A data structure of an evaluation formula generation rule will now be described with reference to FIG. 8 and with reference to FIG. 3 as the occasion may demand. The evaluation formula generation rule is a rule for the evaluation formula generation unit 132 to generate an evaluation formula for making a decision as to a compliance degree with a feature value retained by each node in the index data 223, on the basis of the search query 600 received from the client PC 500.

The evaluation formula generation rule table 143 is composed of a set of a plurality of rules, and is a table formed by extracting one rule which matches a character string described in the search condition 640 in the search query 600, generating a corresponding evaluation formula, and storing the formula into the table.

A rule ID 721 is an identifier for identifying each rule. A search condition pattern 722 is a search pattern character string for collating the search character string described in the search condition 640 therewith. In the present embodiment, the search condition pattern 722 is implemented by normal representation. An evaluation formula 723 stores a pattern of an evaluation formula to be generated and generates an evaluation formula corresponding to the search condition pattern 722.

As for a search pattern corresponding to rule ID="01," in the case of a pattern of a character string "a character string of the search condition 640 begins with "AVG," "MIN" or "MAX," followed by several arbitrary character strings, then ">" and "arbitrary numerical value (X)," the evaluation formula is converted to "F_MIN>X, F_MIN<X<F_MAX."

For example, in the case where the search query as shown in FIG. 3 is specified, a search condition formula described in the search condition 640 is "AVG (gas engine 1, pressure)>1500" and consequently a rule having an ID 721 "01" is complied with it.

In this case, "F_MIN>$2; F_MIN<$2<F_MAX;" is selected as the evaluation formula. By the way, $2 in the evaluation formula is backward reference of regular expression, and a value of "(¥d+)" matching the search pattern, which is "1500" in the above-described example, is substituted into $2. By the way, F_MIN, F_MAX and F_SUM shown in FIG. 8 are feature values in each time period retained by the time-series index. An evaluation formula for evaluating each feature value is generated as described above. If a value obtained by substituting each feature value of the time-series index into the evaluation formula is true, then the feature value is regarded as complying.

For example, in the case where a feature value in a certain time period is MAX=1700 and MIN=800, substituting the feature value into the evaluation formula yields "1700>1500; 800<1500<1700" and consequently the formula is judged to be complying. This means that series data having an average value of at least 1500 as an original search condition formula has a possibility of falling within the range of the lower limit value 800 to the upper limit value 1700.

On the other hand, in the case of a feature value MAX=600, MIN=400 in a different time period, a formula "600>1500; 400<1500<600" does not comply. This means that series data having an average value of at least 1500 as an original search condition formula never matches series data having an upper limit value 600. By the way, in the feature value of the evaluation formula 723, "F_" is prefixed to the present example in order to make a distinction from a feature value calculation function described in the search condition pattern character string.

Data Store Unit

The data store unit 120 will now be described with reference to FIGS. 9 to 11 and FIG. 35 and with reference to FIG. 1 as the occasion may demand.

Figure 9:
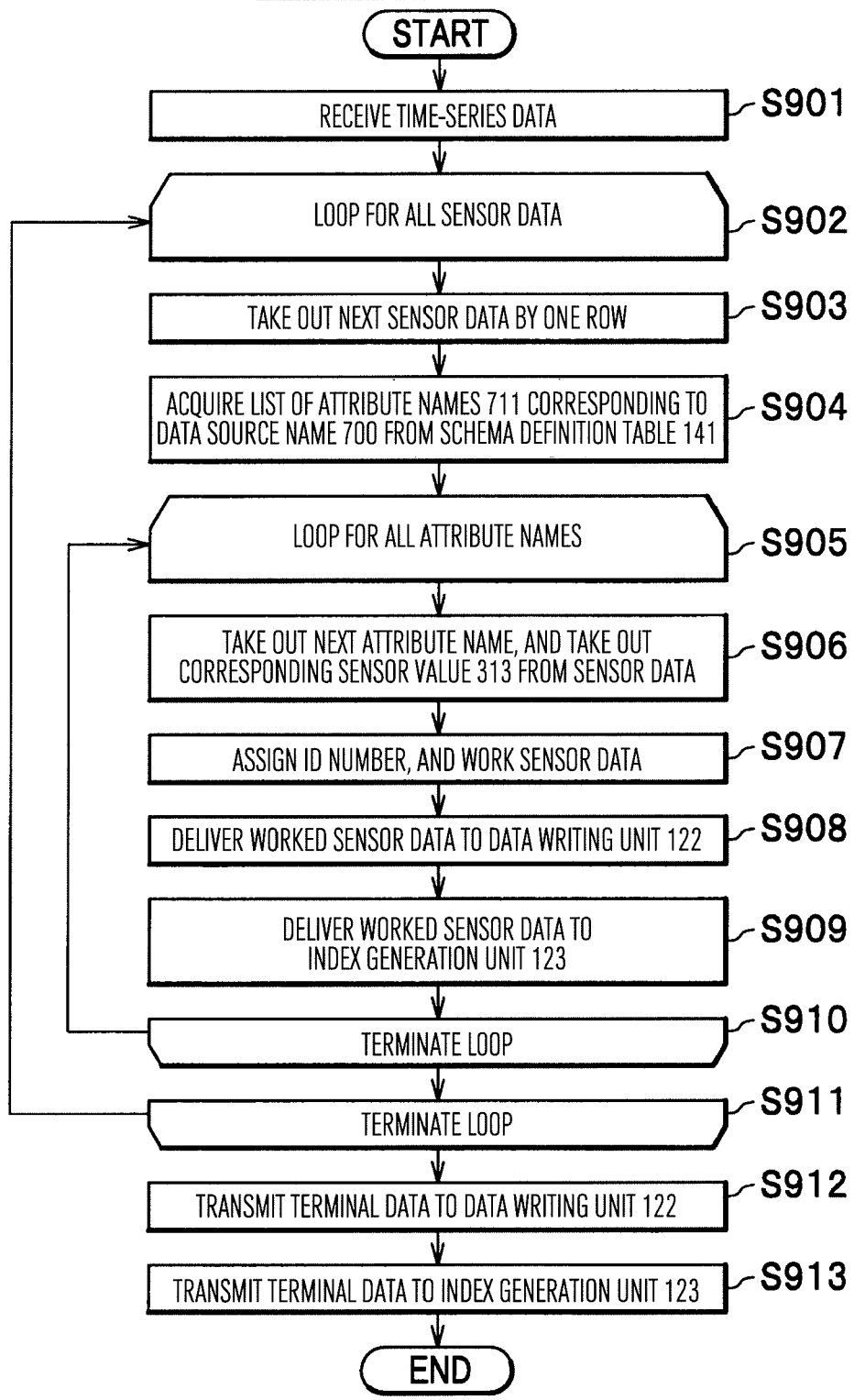
FIG. 9 is a flow chart exemplifying receiving processing conducted when a data receiving unit has received time-series data.

FIG. 9 is a flow chart exemplifying receiving processing S900 conducted when the data receiving unit 121 has received the time-series data 300. In the receiving processing S900, working processing is conducted with the time-series data 300 decomposed every sensor data and every attribute and processing of delivering worked to the data writing unit 122 and the index generation unit 123 is conducted. Hereafter, a flow of the processing will be described with reference to FIG. 9.

The data receiving unit 121 receives the time-series data 300 (S901), and loops processing at S903 to S910 for all sensor data existing in respective rows (S902). The data receiving unit 121 takes out next sensor data by one row (S903), and acquires a list of attribute names 711 corresponding to a data source name 710 of the sensor data from the schema definition table 141 (see FIG. 4) (S904). For example, in an example of "gas engine 1" shown in FIG. 4, "water temperature," "temperature," "pressure," and "the number of revolutions" are acquired.

Then, the data receiving unit 121 loops processing at S906 to S909 for all attribute names (S905). The data receiving unit 121 takes out the next attribute name from the list of attribute names taken out at S904, and takes out a sensor value from the sensor data (S906). For example, in an example of sensor data shown in a first line of FIG. 2, a sensor value "15.2" is taken out as the "water temperature." And conversion to sensor data having only one sensor value every attribute is conducted. After the conversion, the data receiving unit 121 assigns an ID number for identifying uniquely to the sensor data, and conducts working to obtain sensor data having a form of "ID number," "data source name," "attribute name," "time stamp," and "sensor value" (S907).

In addition, the data receiving unit 121 delivers the worked sensor data to the data writing unit 122 successively (S908), and delivers the worked sensor data to the index generation unit 123 (S909). If there are no attributes to be taken out, i.e, if in the above-described example working processing for four attributes of one sensor data is finished, then the processing at S906 to S909 is finished (S910), and the processing proceeds to S911.

The data receiving unit 121 conducts the above-described working processing on all sensor data existing in the time-series data 300. If there are no sensor data to be taken out, the data receiving unit 121 finishes the processing at S903 to S910 (S911) and proceeds to S912. Upon finishing taking out of all sensor data from the time-series data 300, the data receiving unit 121 transmits terminal data to the data writing unit 122 to notify that there are no more data (S912), transmits terminal data to the index generation unit 123 in the same way (S913), and finishes the receiving processing S900.

Figure 10:
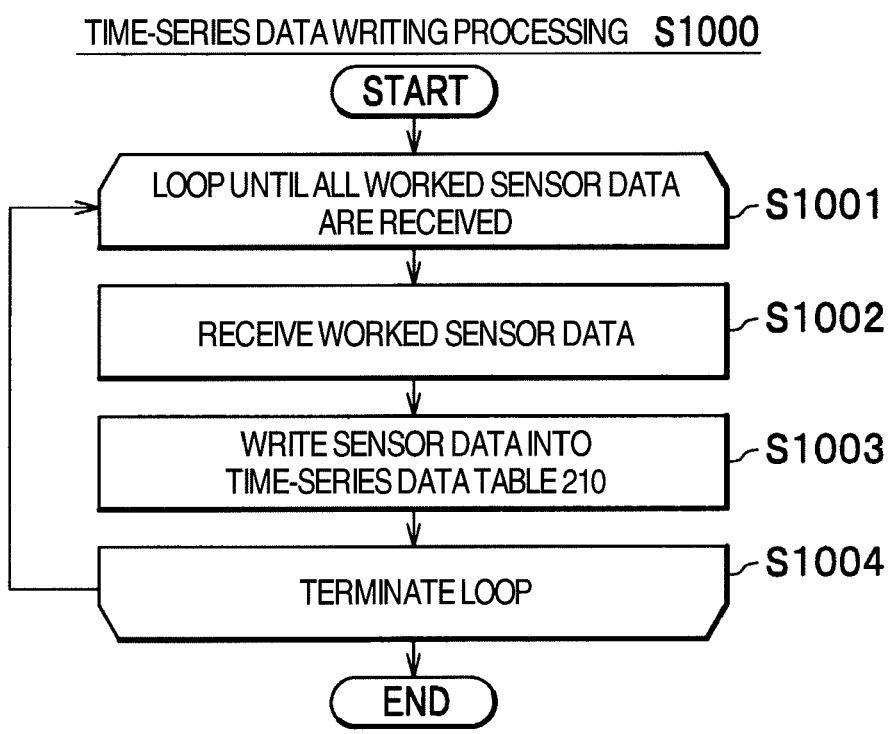
FIG. 10 is a flow chart exemplifying time-series data writing processing conducted by a data writing unit.

FIG. 10 is a flow chart exemplifying time-series data writing processing S1000 conducted by the data writing unit 122. In the time-series data writing processing S1000, the data writing unit 122 conducts processing of receiving worked sensor data from the data receiving unit 121 and writing the worked sensor data into the time-series data table 210 upon occasion. Hereafter, a flow of the processing will be described with reference to FIG. 10.

Until all worked sensor data are received, the data writing unit 122 conducts processing at S1002 and S1003 (S1001). The data writing unit 122 receives worked sensor data from the data receiving unit 121 (S1002), and writes the data into the time-series data table 210 (S1003). Upon receiving the terminal data from the data receiving unit 121, the data writing unit 122 finishes the processing at S1002 and S1003 (S1004), and finishes the time-series data writing processing S1000.

By the way, in the example of the present embodiment, the processing of writing sensor data into a relational database successively is conducted each time the sensor data is received. However, it is also possible to buffer the sensor data into, for example, the memory and write the sensor data to a database in the lump.

Figure 11:
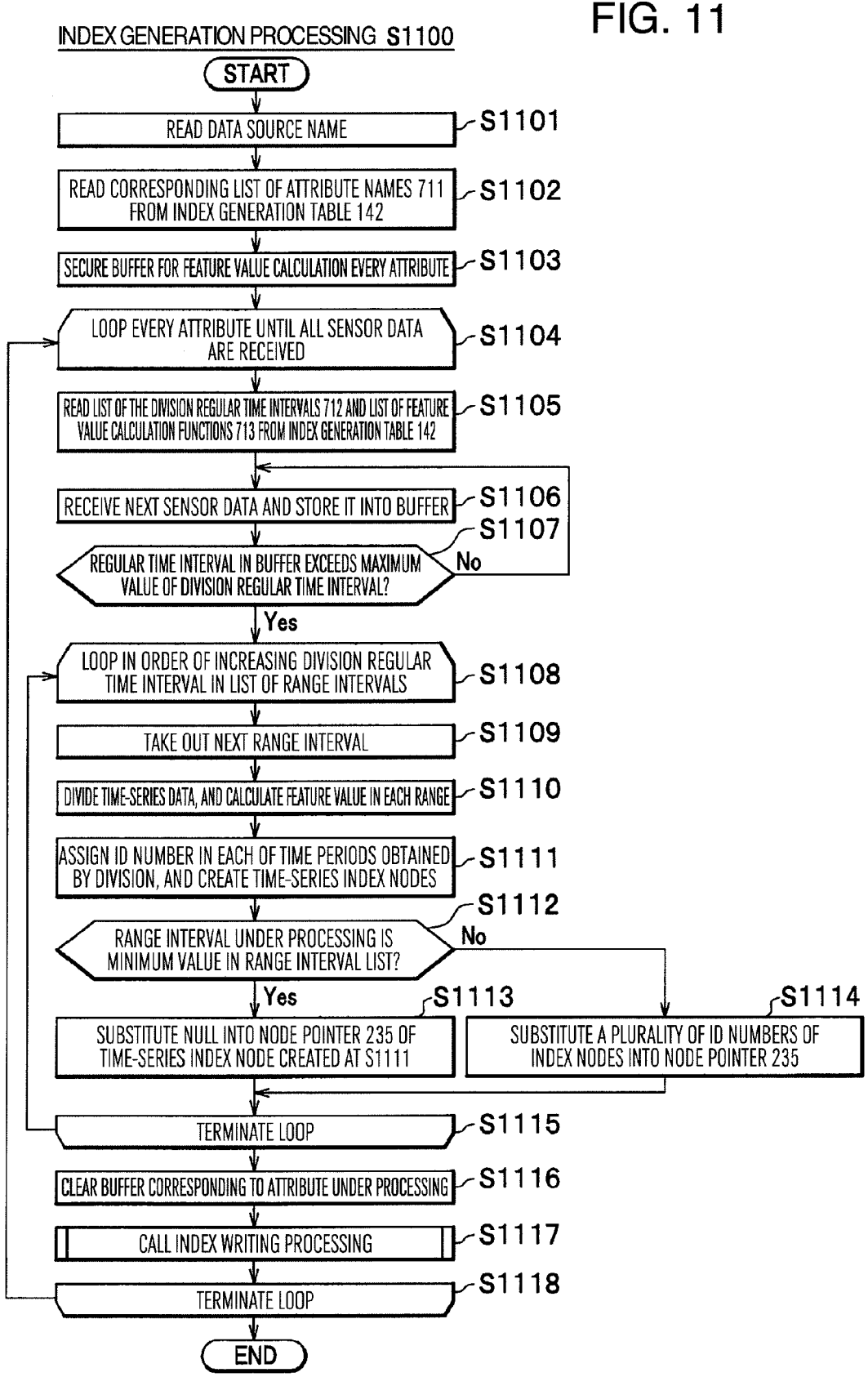
FIG. 11 is a flow chart exemplifying index generation processing conducted by an index generation unit.

FIG. 11 is a flow chart exemplifying index generation processing S1100 conducted by the index generation unit 123. In the index generation processing S1100, the index generation unit 123 conducts processing of receiving sensor data from the data receiving unit 121 upon occasion, calculates a feature value on the basis of the received sensor data, generating a time-series index, and delivering the time-series index to the index writing unit 124. Hereafter, a flow of the processing will be described with reference to FIG. 11.

The index generation unit 123 receives sensor data from the data receiving unit 121, and reads a data source name included in the data (S1101). Then, the index generation unit 123 reads a corresponding list of attribute names 711 from the index generation table 142 (S1102), and secures a buffer for feature value calculation on the memory every attribute (S1103). The buffer for feature value calculation is an area on the memory for temporarily storing sensor data of an operation object to conduct operation on a plurality of sensor data and calculate various feature values. For example, in the case where the data source name of the received time-series data is "gas engine 1" in the example shown in FIG. 6, four attributes ("water temperature," "temperature," "pressure," and "the number of revolutions") are read and four buffer areas are secured.

Until all sensor data are received, the index generation unit 123 conducts processing at S1105 to S1117 to create a time series index every attribute (S1104). The index generation unit 123 reads a list of the division regular time intervals 712 and a list of the feature value calculation functions 713 corresponding to each attribute name, from the index generation table 142 (S1105). In the case where the attribute name is "water temperature" in the example shown in FIG. 6, "1 hour," "30 minutes," and "10 minutes" are read as the list of the range interval and "MAX" and "MIN" are read as the list of feature value calculation functions.

The index generation unit 123 receives sensor data upon occasion, stores the sensor data into the buffer areas corresponding to the attributes (S1106), and makes a decision whether a regular time interval in the buffer areas exceeds a maximum value of the division regular time interval (S1107). If a regular time interval of a set of sensor data accumulated in the buffer areas, i.e., a regular time interval of the time-series data exceeds a maximum value in the list of the division regular time intervals (S1107, Yes), the index generation unit 123 executes S1108 and subsequent steps. Otherwise (S1107, No), the index generation unit 123 returns to S1106 again and receives data upon occasion. For example, in the case where the regular time interval of the time-series data in the buffer area corresponding to the attribute of the "water temperature" exceeds "1 hour" in the case of FIG. 6, the index generation unit 123 executes S1108 and subsequent steps.

The index generation unit 123 conducts processing at S1109 to S1114 in order of increasing division regular time interval in the list of range intervals of the division regular time interval 712 (S1108). In other words, at S1108 and subsequent steps the index generation unit 123 conducts processing of calculating a feature value for time-series data in the buffer area and creating the index data 223.

If the attribute is the "water temperature" in the example shown in FIG. 6, the index generation unit conducts processing in the order of "10 minutes," "30 minutes," and then "1 hour." This is because it is necessary to substitute a pointer of a low order node into the node pointer 235 when creating a time-series index node, and consequently it is necessary to create time-series index nodes in order from a low-order time-series index node.

The index generation unit 123 takes out the next range interval (division regular time interval) (S1109), divides time-series data in the buffer to division regular time intervals, and calculates specified by a feature value calculation function in each range (S1110). In the above-described example, the buffer is divided to time-series data of every "10 minutes" and calculates a "maximum value" and a "minimum value" for each time-series data. After the calculation, the index generation unit 123 conducts pre-processing for creating a time-series index node. Specifically, the index generation unit 123 creates a time-series index node, assigns an ID number to the node, and substitutes "start time" and "end time" of time-series data in each time period, an "ID number" of sensor data indicating the start time, an "ID number" of sensor data indicating the end time, and the "feature value" calculated at S1110 (S1111). By the way, the present node creation is conducted every time period obtained by the division conducted at S1110. For example, in the example shown in FIG. 6, the time period "1 hour" in the buffer is divided to "10 minutes," and consequently a total of six nodes are created.

Then, the index generation unit 123 makes a decision whether a range interval (division regular time interval) of a processing object is a minimum value in the list of range intervals (S1112). In the case where the range interval (division regular time interval) of the processing object is a minimum value in the list of range intervals (S1112, Yes), i.e. a range interval of the lowest order of the time-series index, the index generation unit 123 substitutes "NULL" into the node pointer 235 of the time-series index node created at S1111 (S1113). If the range interval of the processing object isn't a minimum value (S112, No), the index generation unit 123 substitutes a plurality of ID numbers of time-series index nodes belonging to the same range interval and having a range interval which is lower-order by one into the node pointer (S1114) and proceeds to S1115.

Upon finishing the processing at S1109 to S1114 on all division regular time intervals, the index generation unit 123 finishes a loop (S1115) and clears the buffer (S1116). And the index generation unit 123 calls index writing processing (S1117) and delivers a data source name, an attribute name, and index data to the index writing processing. Thereafter, the index generation unit 123 executes S1105 to S1117 repetitively until it receives terminal data from the data receiving unit 121. Upon receiving all sensor data, the index generation unit 123 finishes a loop (S1118) and finishes the index generation processing S1100.

By the way, it is also possible for the index generation unit 123 to reconfigure the index of time-series at arbitrary timing. In this case, a new time-series index can be reconfigured by deleting an old index stored in the time-series index table 220 at timing, for example, when an index update instruction has been received from the client PC 500, taking out all time-series data in the time-series data table 210, and conducting the index generation processing S1100.

In addition, in this index reconfiguration, it is also possible for the index generation unit 123 to link feature values in adjacent time periods in the time-series index at arbitrary timing and thereby calculate a feature value corresponding to a plurality of regular time intervals and reconfigure the time-series index. For example, in the case where there are a node A ("maximum value: 15," "minimum value: 8") and a node B ("maximum value: 18," "minimum value: 10") which have a division regular time interval of 10 minutes and which are adjacent to each other, a new node C ("maximum value: 18," "minimum value: 8") having a division regular time interval of 20 minutes can be created by linking the feature values of them. In other words, the index generation unit 123 links feature values in adjacent regular time intervals for the time series index having the hierarchical structure at arbitrary timing. As a result, the index generation unit 123 can calculate a feature value corresponding to a plurality of regular time intervals and reconfigure a time-series index by regarding a plurality of regular time intervals as a new regular time interval.

In addition, the index generation unit 123 can also dynamically determine the division regular time interval of each node according to a variation of the sensor value without using the division regular time interval 712 in the index generation table 142 (see FIG. 6). For example, processing of providing a time period having a sensor value variation lower than a predetermined level with a large regular time interval and providing a time period having a sensor value variation of at least a predetermined level with a small regular time interval when calculating the feature value can also be applied to the present invention.

Figure 35:
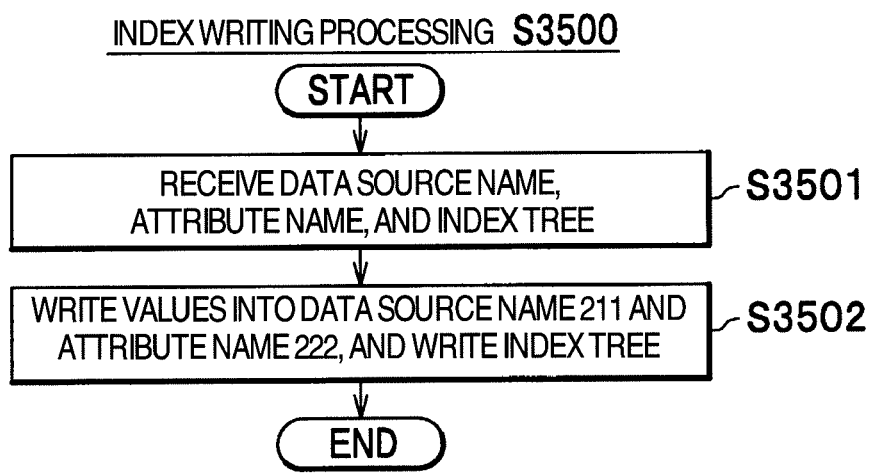
FIG. 35 is a flow chart exemplifying index writing processing conducted by an index writing unit according to the first embodiment.

FIG. 35 is a flow chart exemplifying index writing processing S3500 conducted by the index writing unit 124. Processing of writing the time-series index received from the index generation unit 123 into the time-series index table 220 is conducted. Hereafter, a flow of the processing will be described.

The index writing unit 124 receives a data source name, an attribute name, and an index tree from the index generation unit 123 (S3501). And the index writing unit 124 writes the received values into the data source name 211 and the attribute name 222 in the time-series index table 220, writes the index tree into the index data 223 (S3502), and finishes the index writing processing S3500.

Data Search Unit

The data search unit 130 will now be described with reference to FIGS. 12 to 17 and FIG. 39 and with reference to FIG. 1 as the occasion may demand.

Figure 12:
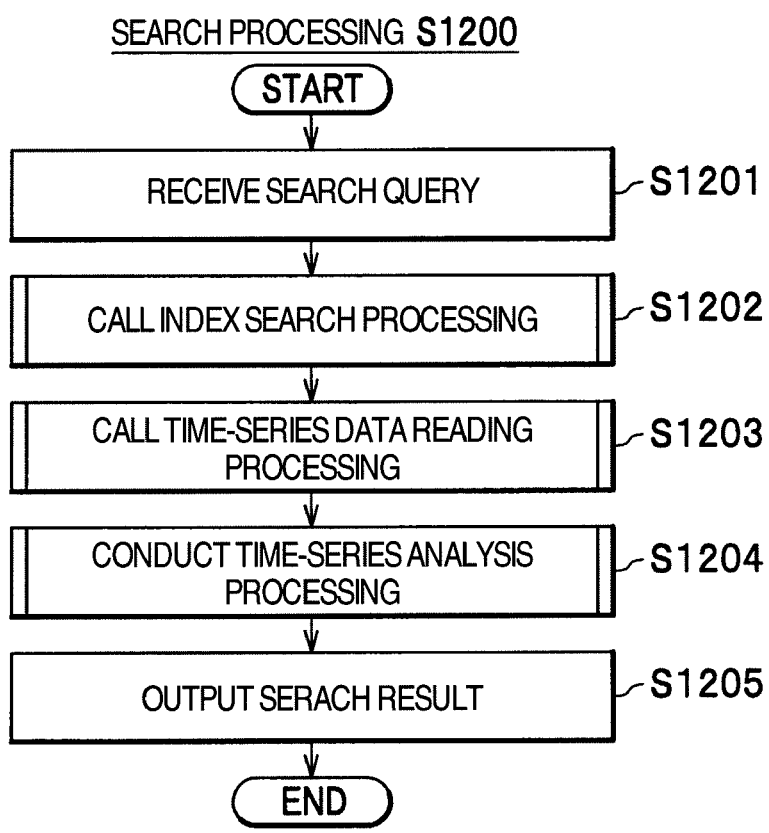
FIG. 12 is a flow chart exemplifying search processing conducted by a search receiving unit.

FIG. 12 is a flow chart exemplifying search processing S1200 conducted by the search receiving unit 131. In the search processing S1200, the search query 600 is received from the client PC 500, processing in the index search unit 133, processing in the data reading unit 134, and processing in the time-series analysis unit 135 are called successively, and a search result is output to the client PC 500. Hereafter, a flow of the processing will be described with reference to FIG. 12.

Upon receiving the search query 600 from the client PC 500 (S1201), the search receiving unit 131 delivers the search query 600 to the index search unit 133, calls index search processing (S1202) which will be described later, and receives an address list of time-series data of a reading object from the time-series data table 210 as an output.

Then, the search receiving unit 131 calls time-series data reading processing in the data reading unit 134 (S1203). In the data reading processing, time-series data which becomes an object of time-series analysis is output as an output result. And the search receiving unit 131 calls time-series analysis processing in the time-series analysis unit 135 (S1204) and delivers the time-series data which is output to the time-series analysis processing. In addition, collation is conducted by the time-series analysis processing, and the search receiving unit 131 receives a search result as an output. Finally, the search receiving unit 131 returns the output data to the client PC 500 (S1205) and finishes the search processing 1200.

Figure 13:
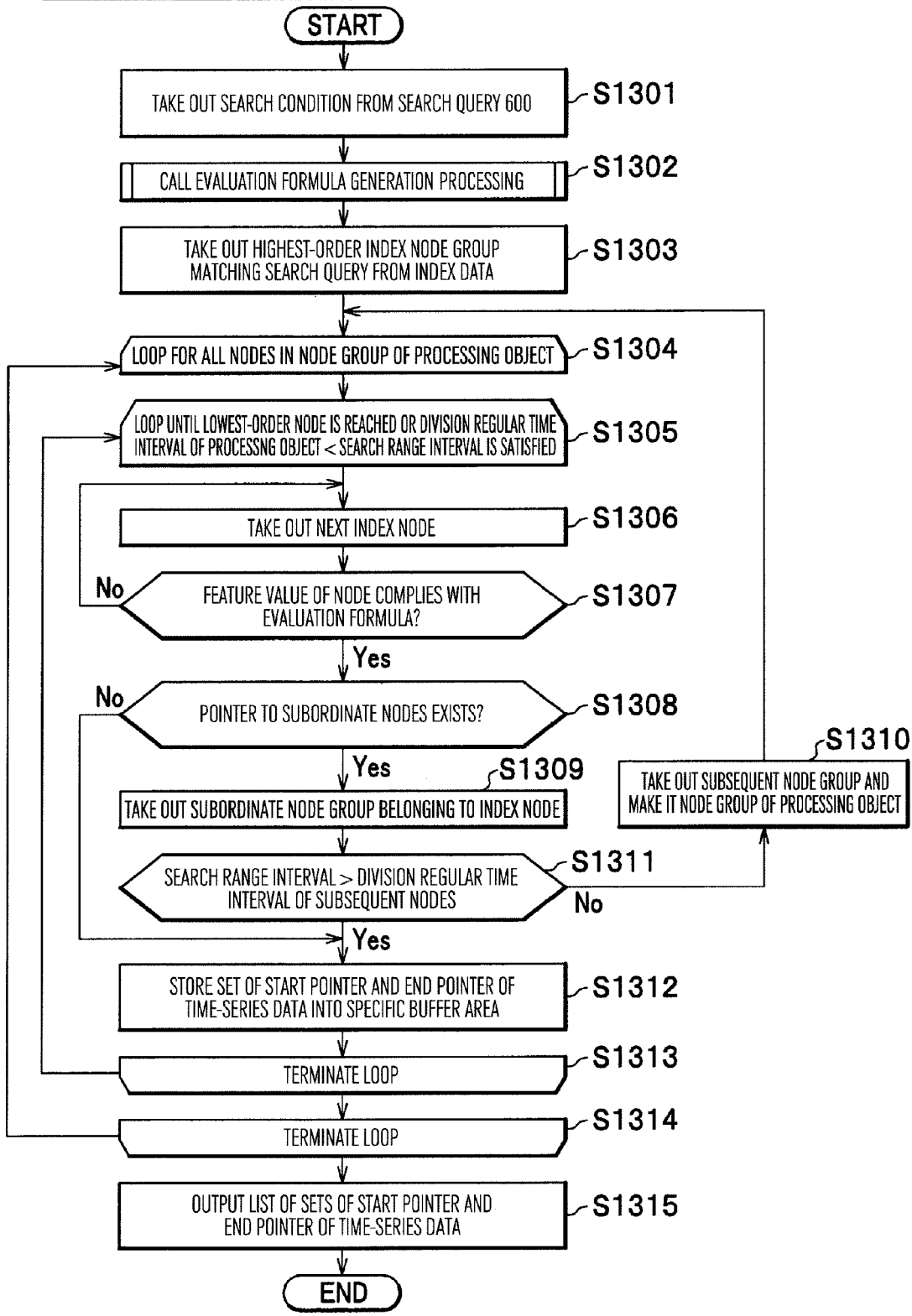
FIG. 13 is a flow chart exemplifying index search processing (regular time interval filtering search) conducted by an index search unit.

FIG. 13 is a flow chart exemplifying index search processing (regular time interval filtering search) S1300 conducted by the index search unit 133. The index search processing S1300 searches the index data 223 for a node group having a feature value which complies with the evaluation formula generated from the search query 600. Since series data in the time period indicated by the node has a possibility of matching the search query 600, the pointer information of the series data is delivered to the data reading unit 134.

If the index data 223 is searched and a node having a division regular time interval which assumes a value close to the search range interval as far as possible while satisfying the relation "division regular time interval>search range interval" can be extracted from the index data 223, then it is possible to prevent wasteful data reading to the utmost when reading time-series data as described above. In the present embodiment, "regular time interval filtering search" (see FIG. 17) and "regular time interval fixing search" (see FIG. 39) will be described as a search method for extracting such a node.

Figure 17:
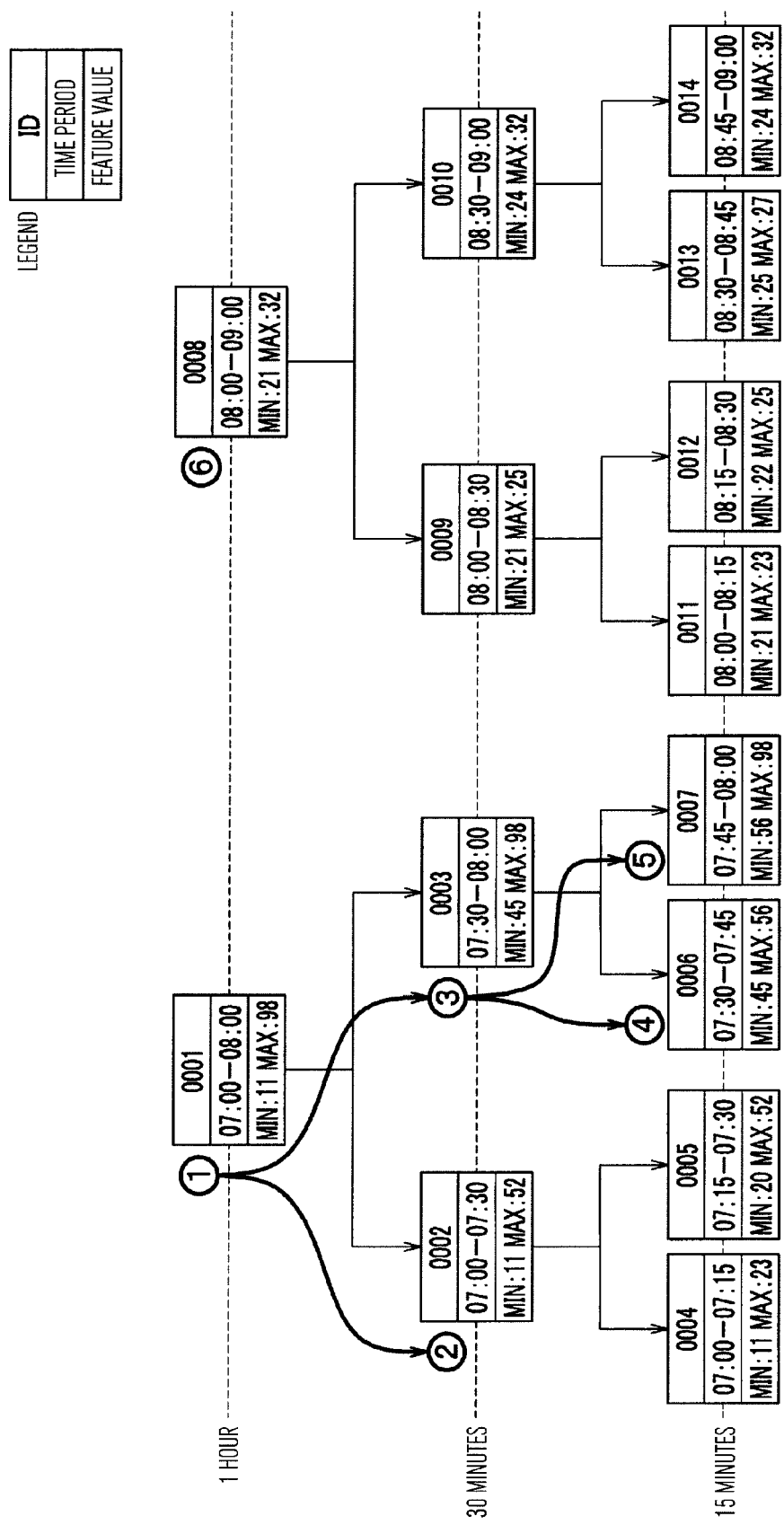
FIG. 17 is a diagram conceptually showing a flow of index search processing conducted by an index search unit.

FIG. 17 is a diagram conceptually showing a flow of the index search processing S1300 conducted by the index search unit 133. The regular time interval filtering search shown in FIG. 17 is a search method of tracing from a high-order node to a low-order node while filtering the regular range interval (division regular time interval) by using depth preference search and setting a range interval at time when the search range interval 610 in the search query 600 assumes a value close to a value of an index range interval as a data reading object. The present scheme is a search method which is effective in the case where feature values of ranges are in an inclusive relation in property, i.e., a feature value in a certain regular time interval A includes a feature value in a regular time interval B belonging to the same time period and having a narrower range than the regular time interval A.

For example, in the case where the feature value is the "range" of sensor value of series data obtained by combining "maximum value" with "minimum value," a range in the regular time interval B is included in a range in the regular time interval A which is wider than the regular time interval B, without fail. For example, if a range in a regular time interval of 1 hour is "10 to 100," then a range in a regular time interval of 30 minutes included in the time period exists in the range of "10 to 100." Hereafter, such a property of the feature value is described simply as "includable" in order to simplify the description.

Returning to the description of the regular time interval filtering search, if a feature value used in a feature value decision at the time of search is includable, a node complying with a high-order node has a possibility of complying with a node which is lower in order than the high-order node. Therefore, a shift to a low-order node is made, i.e., the regular time interval is filtered, and a compliance decision is further made as to the feature value of the low-order node. Conversely, there is a property that a node which does not comply with a high-order node does not comply with a node which is lower in order than the high-order node, without fail. For example, in the case where the range of a high-order is "10 to 100" and the evaluation formula is "minimum value<120<maximum value=>compliance," the maximum value of the high-order range is less than 120 and consequently compliance is not obtained. The maximum value of the low-order range is included in the high-order range and consequently it becomes smaller than the maximum value of the high-order range. Therefore, it is evident that compliance is not obtained in the same way. If a node does not comply with a node in the high-order range, therefore, it is not necessary to shift to a node which is lower in order than that and wasteful complying processing can be omitted.

A flow of search will now be described with reference to the concrete example shown in FIG. 17 as well. In FIG. 17, the regular time interval has a structure of three hierarchical levels: "1 hour," "30 minutes," and "15 minutes." In the case where the evaluation formula is "MIN<78<MAX=>compliance" and the search range interval 610 is "20 minutes," a flow of search becomes as shown in FIG. 17. By the way, only an ID number, a time period, and a feature value are described in each node shown in FIG. 17 to simplify the description.

First, since a node "0001" complies with the evaluation formula, its subordinate nodes are evaluated. Since a node "0002" does not comply, its subordinate nodes "0004" and "0005" do not comply without fail and consequently decision processing is not conducted. On the other hand, since a node "0003" complies, a decision is made as to its subordinate nodes "0006" and "0007." As a result, a node "0007" complies, and consequently the node "0007" is extracted.

Then, returning to the highest-order node, a decision is made as to a node "0008." Since the node "0008" does not comply, a decision is not made as to its subordinate nodes. Since the decision processing can be conducted efficiently as described heretofore, the search speed at the time of the time-series index search can be improved.

Referring back to FIG. 13, a processing flow of the index search processing (regular time interval filtering search) S1300 will be described hereafter. The index search unit 133 receives the search query 600 (see FIG. 3) from the search receiving unit 131, takes out a search condition formula described in the search condition 640 in the search query 600 (S1301), calls evaluation formula generation processing S1400 (see FIG. 14) in the evaluation formula generation unit 132, and receives an evaluation formula as an output (S1302).

Then, the index search unit 133 searches the index data 223 for a highest-order index node group included in a search object range which is described in the search object range 630 in the search query 600 and takes out the highest-order index node group (S1303). For example, in the example shown in FIG. 7, nodes included in the time-series nodes 230a, 230b, ... which belong to the highest-order node group 240a and having a time period 232 included in a specified search object range are read.

Then, the index search unit 133 conducts processing ranging from S1305 to S1313 on all nodes in the node group which is now an object of the processing (S1304). If a feature value of each node complies with the evaluation formula, then a shift to its subordinate node is made and a feature value evaluation is conducted again in order to further filter the regular time interval and conduct re-evaluation. The index search unit 133 repeats the evaluation processing until the lowest-order node is reached, or a range interval (division regular time interval) of an object node becomes smaller in value than the search range interval 610 in the search query 600, i.e., the search range interval (S1305).

Hereafter, processing for that purpose will be described with reference to S1305 and subsequent steps. The index search unit 133 executes S1306 to S1312 on all time-series index nodes belonging to the same hierarchical level in the range interval of the processing object. First, the index search unit 133 takes out one index node in time order (S1306) and makes a decision whether a feature value the node has complies with the evaluation formula (S1307). If the feature value does not comply (S1307, No), the index search unit 133 returns to S1306 and takes out the next time-series index node. If the feature value complies (S1307, Yes), the index search unit 133 makes a decision whether a pointer to subordinate nodes of the node exists (S1308). If the pointer exists (S1308, Yes), the index search unit 133 takes out a subordinate node group (S1309) and makes a decision whether a division regular time interval of the node group is smaller than the search range interval 610 (S1311). If the division regular time interval is smaller (S1311, Yes), the index search unit 133 stores a set of a start pointer and an end pointer of time-series data indicated by the above-described index node which has complied into a specific buffer area for outputting (S1312).

If the range interval (division regular time interval) of a subsequent node is greater than or equal to the search range interval 610 at S1311 (S1311, No), then the index search unit 133 shifts a processing object to the subsequent node group and recursively executes the processing at S1304 and subsequent steps again. If the lowest-order node is reached or the relation represented as the division regular time interval of the processing object node<the search range interval is satisfied, then the index search unit 133 finishes a loop of S1305 (S1313). In addition, upon finishing the processing of S1305 to S1313 on all nodes of the processing object, the index search unit 133 finishes a loop of S1304. And the index search unit 133 outputs a list of sets of start pointer and end pointer of time-series data retained in the buffer area (S1315) and finishes the index search processing S1300. By the way, the present pointer becomes a data series to be read from the time-series data table 210 thereafter. The start/end pointer of the time-series data is referred to as "time-series data section address."

In the present processing, going upstream is conducted in order from a superordinate node when conducting processing for extracting an index having a range in which the division regular time interval and the search range interval assume values which are close as far as possible while satisfying the condition that the division regular time interval>the search range interval 610. If the evaluation formula does not match a feature value of a superordinate node, feature values of all nodes belonging to subordinate nodes of the superordinate node do not match without fail, according to the feature of the time-series data. The reason why going upstream is conducted in order from a superordinate node is that there is a merit that wasteful complying processing can be omitted because the feature of the time-series data is utilized.

The regular time interval fixing search will now be described with reference to FIGS. 38 and 39. The regular time interval fixing search is a search method in which the evaluation object is only a node group having a division regular time interval which is close in value to the search range interval 610 as far as possible while satisfying the relation that the division regular time interval>the search range interval 610.

Figure 38:
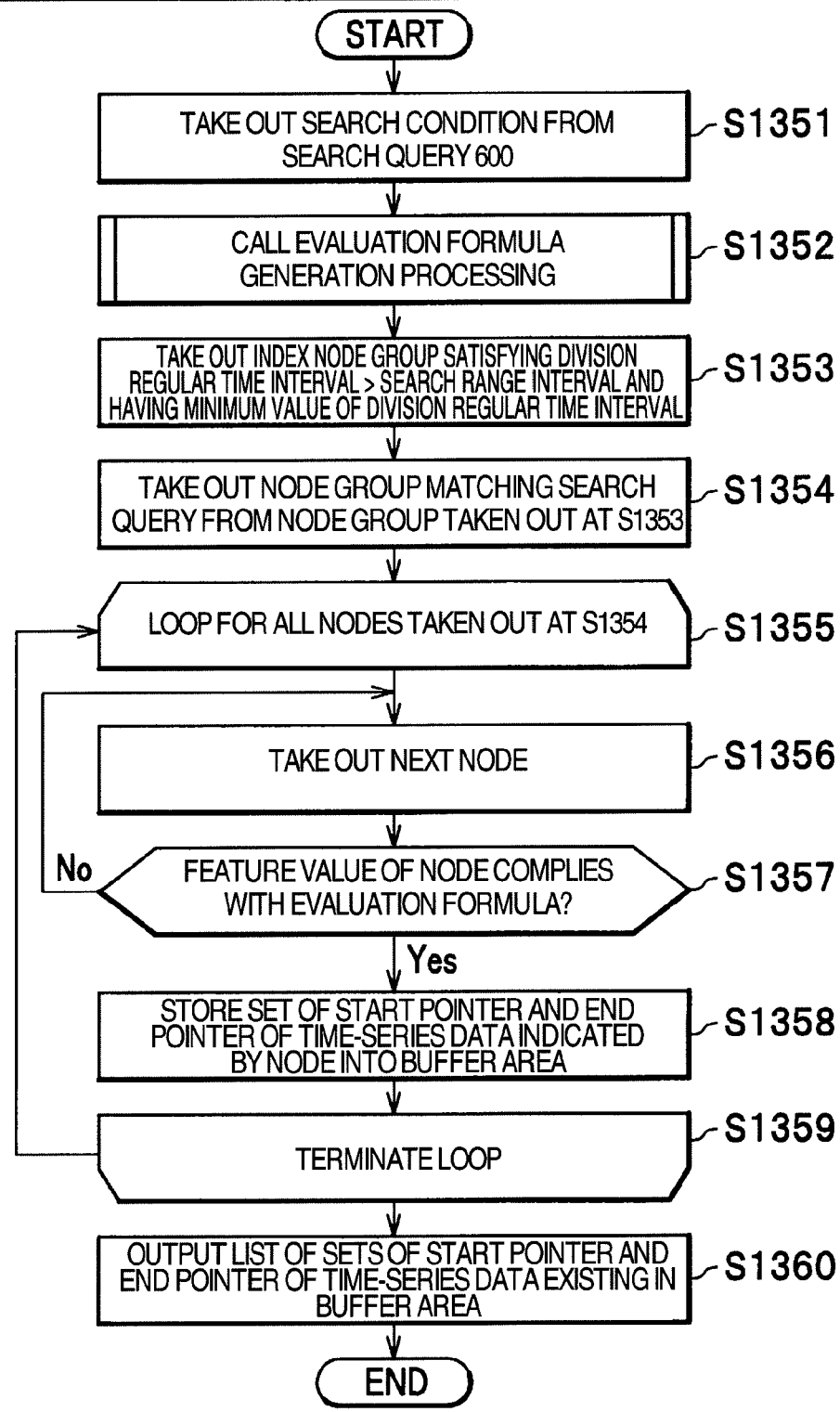
FIG. 38 is a flow chart exemplifying index search processing (regular time interval fixing search) conducted by an index search unit.
Figure 39:
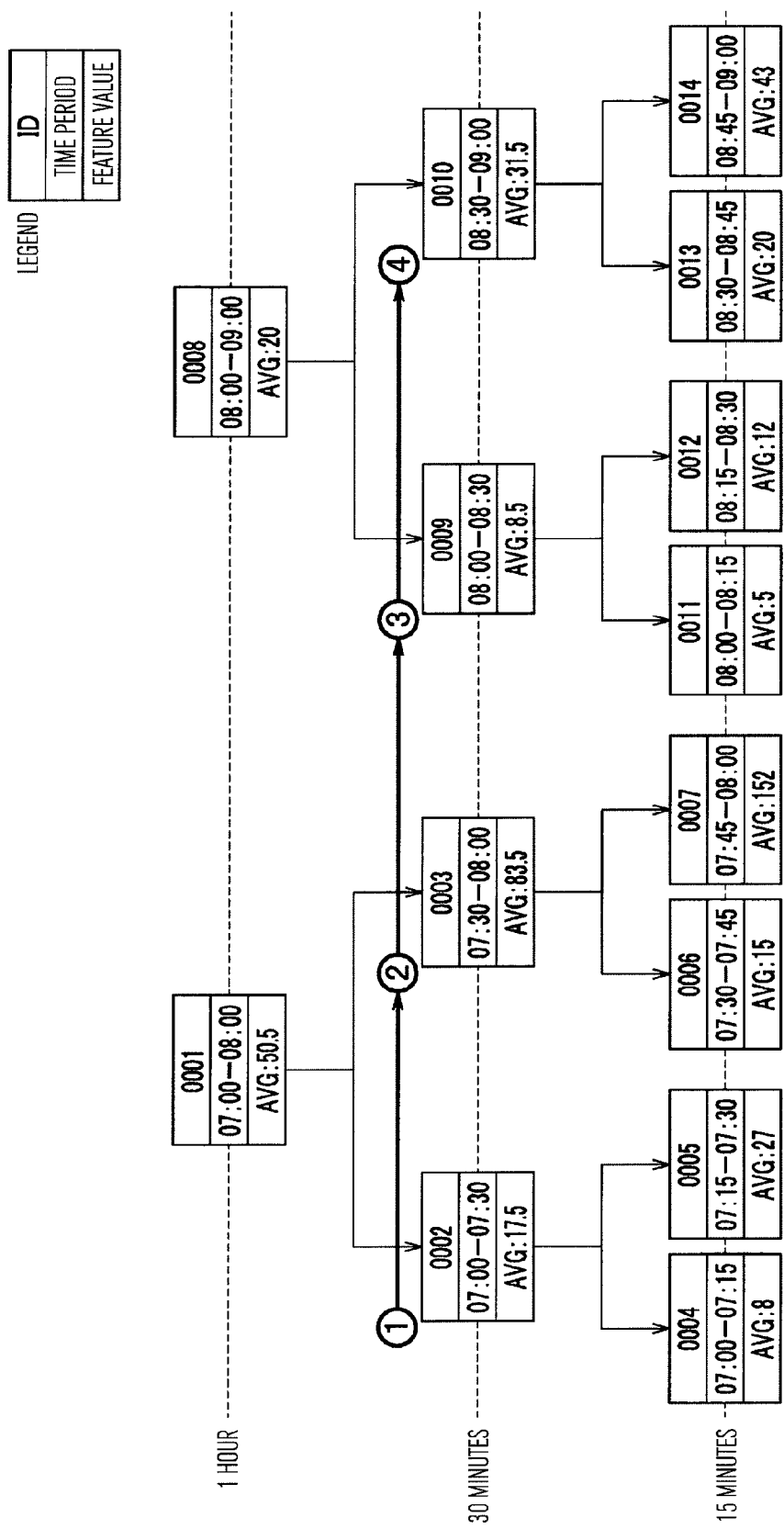
FIG. 39 is a diagram conceptually showing a flow of index search processing (regular time interval fixing search) conducted by an index search unit.

FIG. 39 is a diagram conceptually showing a flow of index search processing (regular time interval fixing search) S1350 (see FIG. 38) conducted by the index search unit 133. The present scheme is used in the case where the regular time interval filtering search does not function effectively, i.e., the feature value used in evaluation has a "non-includable" property. Specifically, the present scheme is used, for example, in the case where filtering according to the regular time interval does not function effectively.

For example, in the case where an average value "AVG" is used as a feature value to be evaluated, the evaluation formula is "AVG>60=> compliance," and the search range interval is "20 minutes," the regular time interval filtering search is applied to FIG. 39. As a result, a node "0001" does not comply. However, a node "0003" which is its subordinate node complies. Eventually, therefore, it becomes necessary to search all nodes. In this case, first, only nodes having a division regular time interval of the search object, which is "30 minutes" in the present example, are assumed as the search object. Nodes "0002," "0003," "0009," "0010," . . . are searched successively.

By the way, nodes having the same division regular time interval are searched sequentially in order of time, in the example shown in FIG. 39. However, the present invention is not restricted to it. For example, it is also possible to provide each of feature values with a B-tree structure and conduct a B-tree search. By the way, the B-tree structure refers to a structure divided to route nodes, branch nodes, and leaf nodes.

FIG. 38 is a flow chart exemplifying the index search processing (regular time interval fixing search) S1350 conducted by the index search unit 133. A flow of the processing of the regular time interval fixing search will now be described with reference to FIG. 38.

The index search unit 133 receives the search query 600 from the search receiving unit 131, takes out a search condition formula described in the search condition 640 in the search query 600 (S1351), calls the evaluation formula generation processing S1400 (see FIG. 14) in the evaluation formula generation unit 132, and receives an evaluation formula as an output (S1352).

Then, the index search unit 133 takes out an index node group which satisfies the relation that the division regular time interval>the search range interval 610 and which has a minimum value of division regular time interval (S1353), takes out a node group matching the search object range 630 in the search query 600 from the index node group (S1354), and executes processing ranging from S1356 to S1358 on all nodes taken out (S1355).

The index search unit 133 takes out one node (S1356) and makes a decision whether a feature value of the node complies with the evaluation formula (S1357). If the feature value does not comply (S1357, No), the index search unit 133 returns to S1356. If the feature value complies (S1357, Yes), the index search unit 133 stores a set of a start pointer and an end pointer of time-series data indicated by the node into a specific buffer area (S1358). Upon finishing the processing on all nodes which are taken out at S1354, the index search unit 133 finishes a loop of S1355 (S1359). And the index search unit 133 outputs a list of sets of start pointer and end pointer of time-series data existing in the buffer area (S1360).

By the way, it is also possible for the index search unit 133 to link feature values in adjacent time periods at the time of search and thereby calculate a feature value corresponding to a plurality of division regular time intervals, make a decision as to the feature value according to the evaluation formula, and identify a time period of a complying data series group.

For example, in the case where there are a node A ("maximum value: 15," "minimum value: 8") and a node B ("maximum value: 18," "minimum value: 10") which have a division regular time interval of 10 minutes and which are adjacent to each other, it is possible to link the feature values of them, thereby dynamically create a feature value ("maximum value: 18," "minimum value: 8") having a division regular time interval of 20 minutes, and make a decision according to an evaluation formula.

Figure 14:
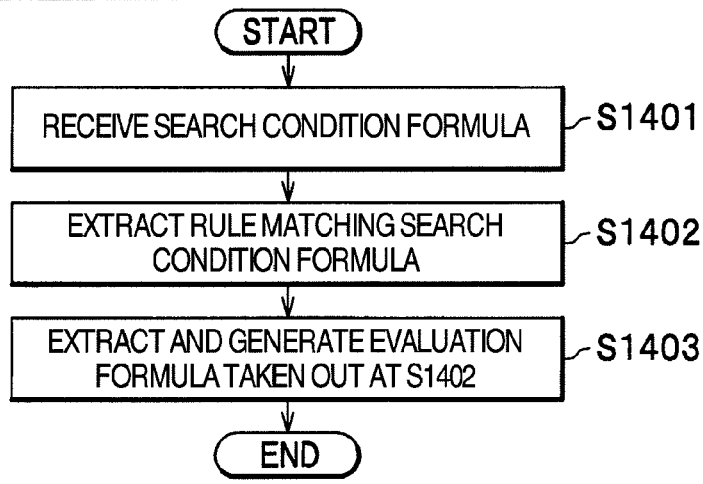
FIG. 14 is a flow chart exemplifying evaluation formula generation processing conducted by an evaluation formula generation unit.

FIG. 14 is a flow chart exemplifying the evaluation formula generation processing S1400 conducted by the evaluation formula generation unit 132. In the evaluation formula generation processing S1400, an evaluation formula is generated on the basis of the search condition formula described in the search query 600, specifically on the basis of the formula described in the search condition 640. Hereafter, a flow of the processing will be described with reference to FIG. 14.

The evaluation formula generation unit 132 receives the search condition formula described in the search condition 640 in the search query 600 from the index search unit 133 (S1401) and extracts a rule which matches the search condition formula from the evaluation formula generation rule table 143 (S1402). For example, in the case of the search condition formula in the example shown in FIG. 3, the rule having the rule ID=01 in FIG. 8 is extracted. The evaluation formula generation unit 132 extracts and generates a corresponding evaluation formula from the extracted rule (S1403) and finishes the evaluation formula generation processing S1400.

Figure 15:
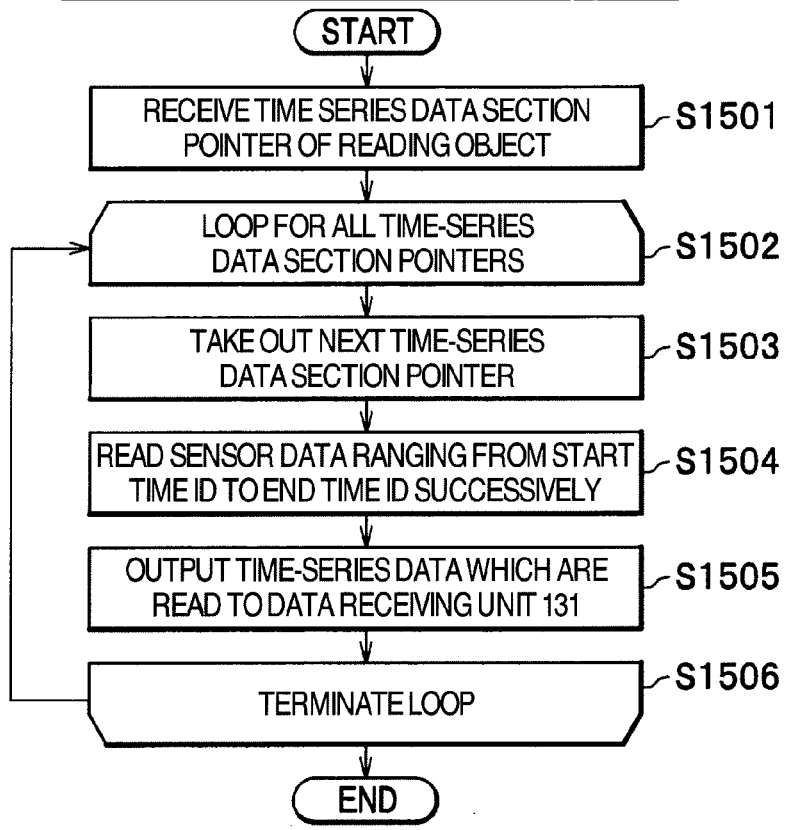
FIG. 15 is a flow chart exemplifying time-series data reading processing conducted by a data reading unit.

FIG. 15 is a flow chart exemplifying time-series data reading processing S1500 conducted by the data reading unit 134. In the time-series data reading processing S1500, a data series having a possibility of matching the search query 600 is read from the time series data table 210 (see FIG. 5). Hereafter, a flow of the processing will be described with reference to FIG. 15.

The data reading unit 134 receives a time series data section pointer list which becomes an object of reading, from the search receiving unit 131 (S1501). As described earlier, the time series data section pointer is composed of a set of a start address and an end address of series data to be extracted from the time-series data table 210, and the ID 211 is included as the address.

The data reading unit 134 executes processing ranging from S1503 to S1505 which will be described hereafter, on all time-series data section pointers (S1502). The data reading unit 134 takes out one of the time-series data section pointers (S1503), reads sensor data ranging from a start time ID to an end time ID included in the time-series data section pointer from the time-series data table 210 (S1504), and outputs the time-series data which are read to the search receiving unit 131 (S1505). Upon finishing the processing ranging from S1503 to S1505 on all time-series data section pointers, the data reading unit 134 finishes a loop (S1506) and finishes the time-series data reading processing S1500.

Figure 16:
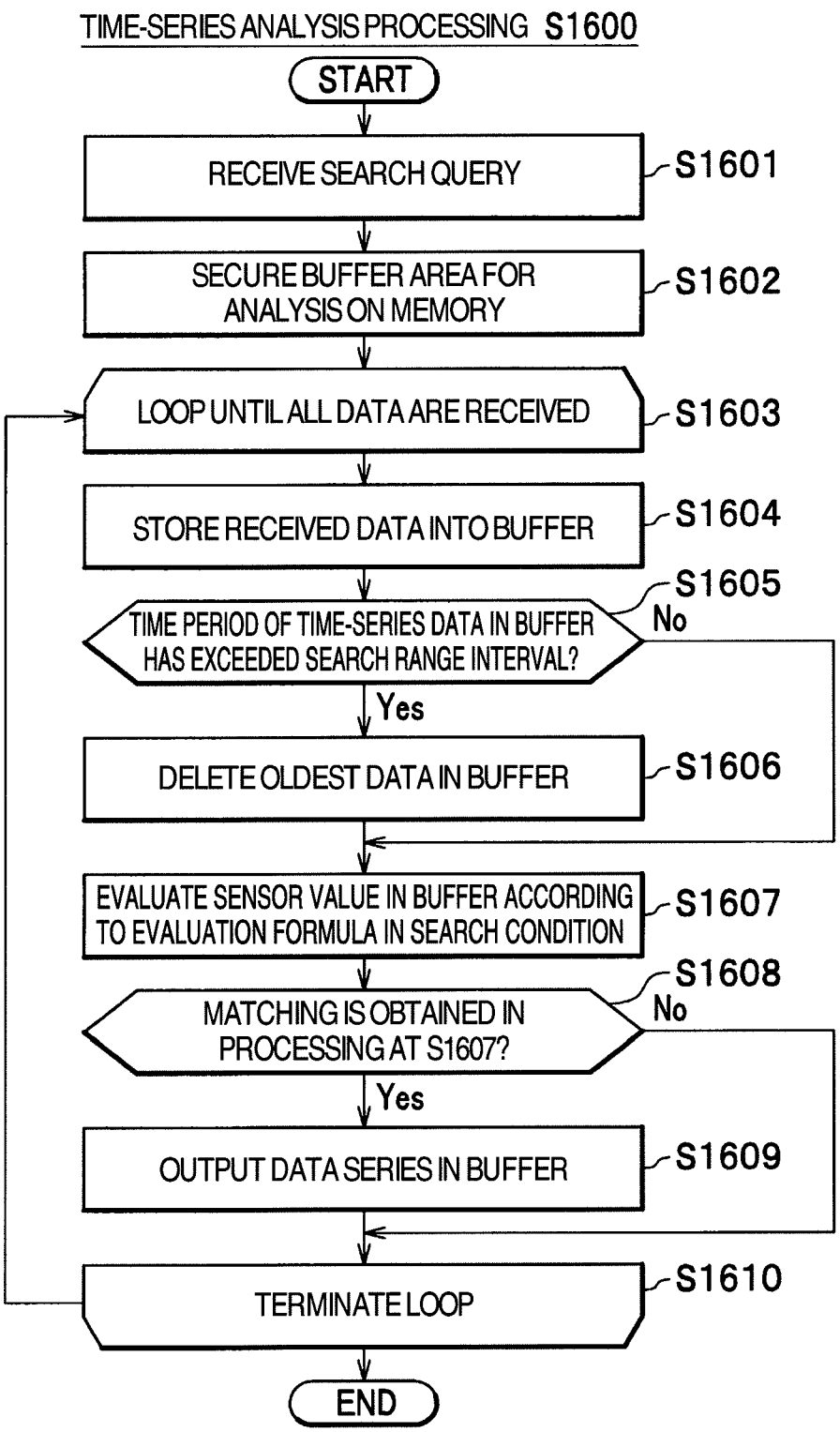
FIG. 16 is a flow chart exemplifying time-series analysis processing conducted by a time-series analysis unit.

FIG. 16 is a flow chart exemplifying time-series analysis processing S1600 conducted by the time-series analysis unit 135. Upon receiving the search query 600 from the data receiving unit 121 (S1601), the time series analysis unit 135 secures a buffer area for analysis on the memory (S1602), and executes S1604 to S1609 until all it receives all data (S1603).

The time-series analysis unit 135 stores the received data into the buffer successively (S1604), and makes a decision whether a time period of time-series data in the buffer has exceeded the search range interval 610 (S1605). If the time period of time-series data in the buffer has exceeded the search range interval 610 (S1605, Yes), the time-series analysis unit 135 deletes the oldest data in the buffer (S1606). Otherwise (S1605, No), the time-series analysis unit 135 executes S1607 and subsequent steps. At S1607, a sensor value of sensor data in the buffer is evaluated according to the evaluation formula in the search condition 640. In its collation processing, a decision is made whether matching is obtained (S1608). If matching is obtained (S1608, Yes), the time-series analysis unit 135 outputs a data series in the buffer to the data receiving unit 121 (S1609). Otherwise (S1608, No), the time-series analysis unit 135 proceeds to S1610. Upon receiving all data, a loop of S1603 is finished (S1610) and the time-series analysis processing S1600 is finished.

Hereafter, the present embodiment will be summarized. The time-series data management device 100 includes the data accumulation unit 120 for accumulating time-series data 300 of a search object into the external storage device 200, and the data search unit 130 for searching the accumulated time-series data 300 for a data series complying with the search query 600 which is input from the client PC 500.

The data accumulation unit 120 includes the index generation unit 123 for calculating a feature value (for example, a feature value indicated in feature value calculation function shown in FIG. 7) of a data series every specific regular time interval (for example, every division regular time interval 712 shown in FIG. 7) when accumulating the time-series data 300, the index writing unit 124 for writing the calculated feature value of the data series of every regular time interval into the external storage device 200 as the time-series index table 220 (time-series index information), and the data writing unit 122 for writing the time-series data 300 into the external storage device 200 as the time-series data table 210 (time-series data information).

The data search unit 130 includes the evaluation formula generation unit 132 for generating an evaluation formula to judge degrees of compliance with each feature value in the time-series index information on the basis of the search query 600 when searching the time-series data 300, the index search unit 133 for making a decision as to a feature value of every time period included in the time-series index information by using the evaluation formula and identifying a time period of a complying data series group, the data reading unit 134 for extracting a data series corresponding to the identified time period from the time-series data information, and the time-series analysis unit 135 for collating the extracted data series with the search condition in the search query.

The time-series index information includes the index hierarchical structure (for example, index data 223) composed of a plurality of time-series indexes, every attribute name in the time-series data 300. The time-series index includes the time period 232 including the start time and the end time of the time-series data 300, the feature value 233 of the time period, and the node pointer 235 of subordinate time-series indexes included in the index hierarchical structure.

Second Embodiment

A second embodiment of the present invention will now be described.

Figure 18:
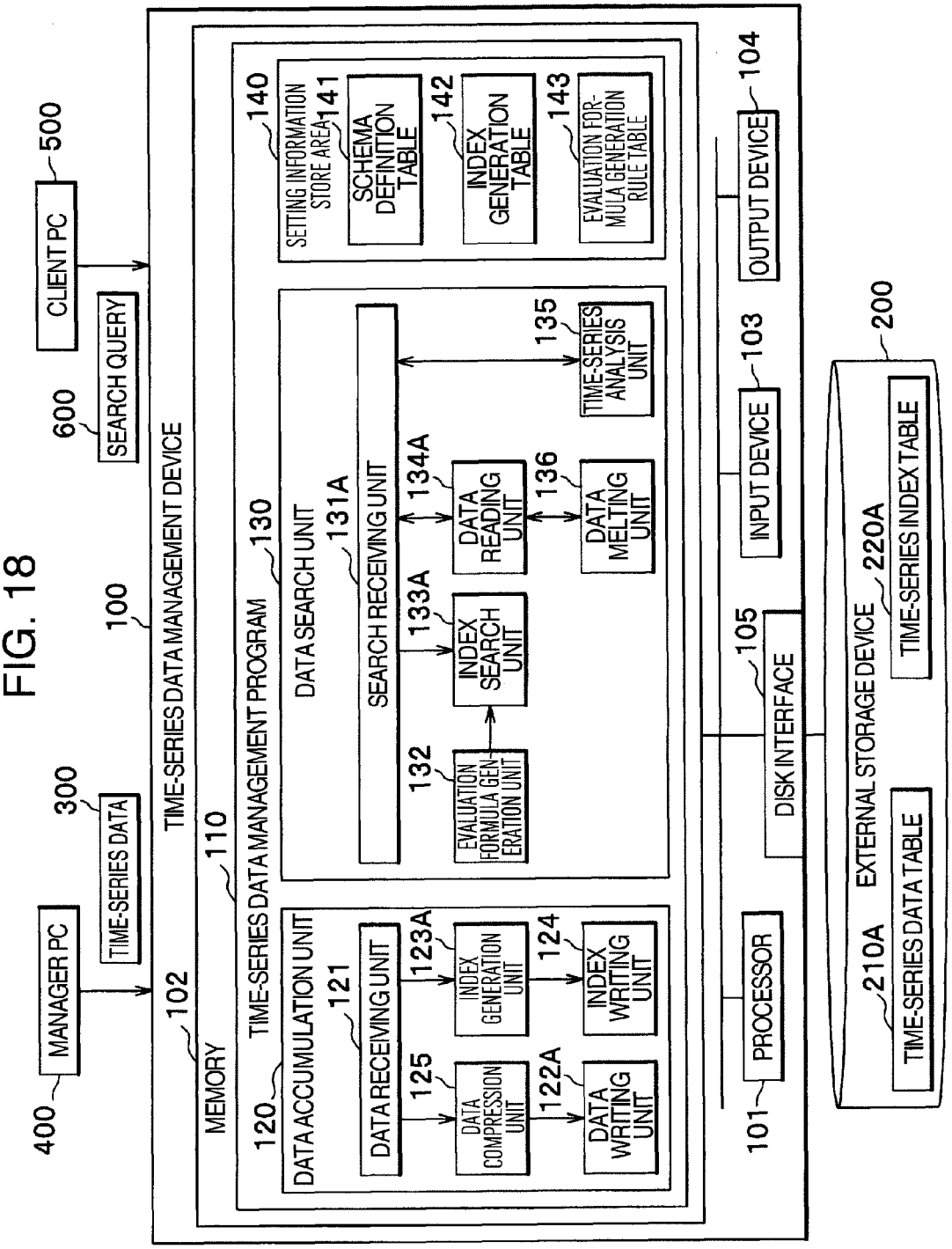
FIG. 18 is a diagram exemplifying a general configuration of a system according to a second embodiment of the present invention.

FIG. 18 is a diagram showing a general configuration of a system according to the second embodiment of the present invention. In addition to the general configuration of the system according to the first embodiment, a data compression unit 125 and a data melting unit 136 are added. When storing the time-series data 300 into the time-series data table 210 in the present embodiment, a data series is compressed and stored every specific regular time interval. Furthermore, at the time of search, the data series is taken out by reading compressed data from the time-series data table 210 and melting the compressed data.

In relation to the data compression unit 125 and the data melting unit 136, a part of processing conducted by the data writing unit 122A, the index generation unit 123A, the search receiving unit 131A, the index search unit 133A and the data reading unit 134A is changed and it will be described later. Since processing except the changed part of processing is the same as that of the first embodiment, description thereof will be omitted. By the way, in the general configuration shown in FIG. 18, components which are the same as those in the first embodiment are denoted by like reference numerals and description of them will be omitted.

The data compression unit 125 conducts processing of receiving worked sensor data from the data receiving unit 121 and generating compressed data. The data melting unit 136 receives compressed data of time-series data from the data reading unit 134A and melts the compressed data.

Figure 19:
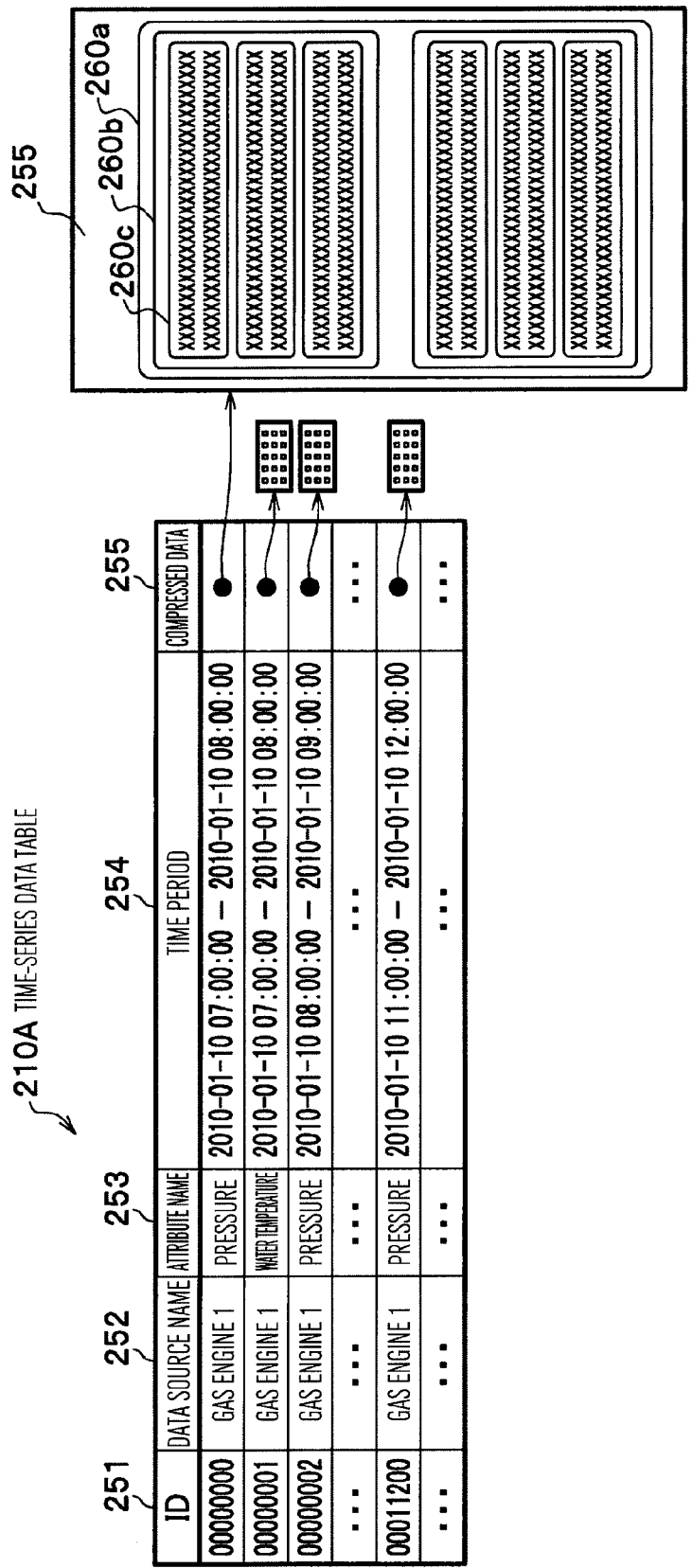
FIG. 19 is a diagram exemplifying a time-series data table having compressed data.

FIG. 19 is a diagram exemplifying a time-series data table 210 having compressed data. The time-series data table 210A is composed of an ID 251, a data source name 252, an attribute name 253, a time period 254, and compressed data 255. In each line of the compressed data 255, a data series in a regular time interval is compressed and stored. The ID 251, the data source name 252, and the attribute name 253 are equivalent to those in the first embodiment, and consequently description of them will be omitted.

In the example shown in FIG. 19, a time period of the data series stored in the compressed data is described in the time period 254. It is indicated that data corresponding to one hour is stored in the compressed data 255. The compressed data 255 is data obtained by compressing sensor data in a time period described in the time period 254. The compressed data 255 is stored in, for example, a binary form.

As for the compressed data 255, it is possible to compress and store data hierarchically every a plurality of division regular time intervals. For example, in the illustrated example, data 260c is data obtained by compressing individual sensor data with a regular time interval of 10 minutes taken as the unit, data 260b is data obtained by collectively compressing individual compressed data of the data 260c included in the same time period, and data 260a is data obtained by collectively compressing the data 260b included in the same time period in the same way. In the present embodiment, ZIP is used as a method of the compression. In the present invention, however, an arbitrary algorithm can be applied.

A merit that the volume included in the time-series data table 210 can be reduced is obtained by compressing the sensor data. Besides the merit, there is also a merit of advantage in performance because a plurality of sensor data can be collectively read in one disk I/O. For example, if sensor data are at intervals of one second, it is necessary to read 3,600 lines in the case where the sensor data are not compressed, in order to read data corresponding to one hour. On the other hand, it suffices to read once in the case where the sensor data are compressed.

By the way, the present embodiment has a hierarchical compression structures by taking a plurality of division regular time intervals as the unit. Alternatively, however, data may be stored into the compressed data 255 without a hierarchical structure by taking a data series compressed with an arbitrary division regular time interval taken as unit, as the unit.

FIG. 20 is a diagram exemplifying data structures of a time-series index table 220A and a time-series index node according to the second embodiment. FIG. 20(a) shows an example of a data structure of the time-series index table 220A, and FIG. 20(a) shows a structure of each node included in a tree of time-series index nodes. By the way, the time-series index table 220A shown in FIG. 20(a) and the ID 231, the start time 232a, the end time 232b, the feature value 233, and the node pointer to subsequent indexes 235 are the same as those in the first embodiment, and consequently description of them will be omitted. In the example of the present embodiment, the ID 251 (see FIG. 19) of compressed data including a data series corresponding to the node is indicated as a pointer 236 to time-series data.

Figure 21:
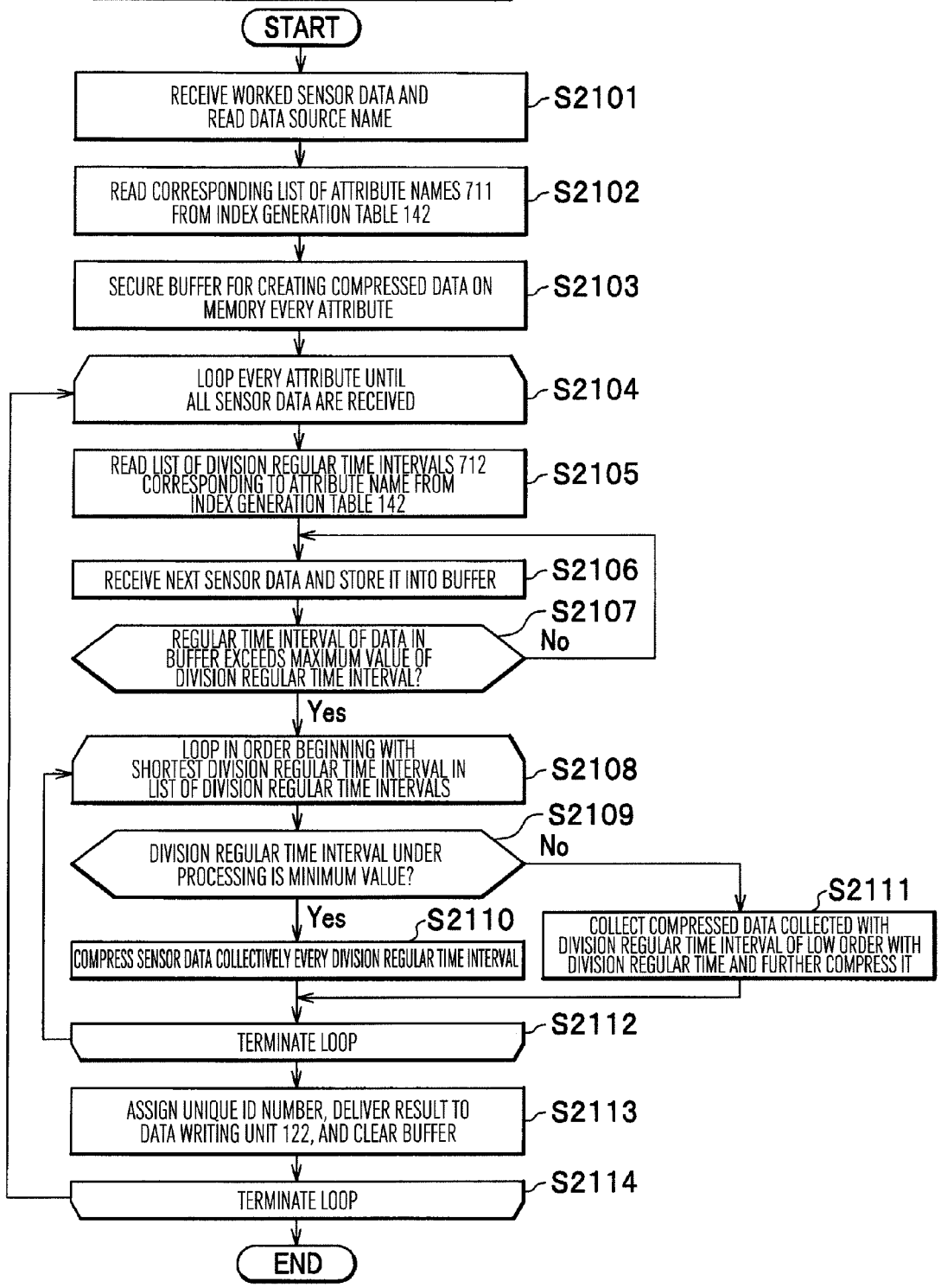
FIG. 21 is a flow chart exemplifying data compression processing conducted by a data compression unit.

FIG. 21 is a flow chart exemplifying data compression processing S2100 conducted by the data compression unit 125. The data compression unit 125 receives worked sensor data from the data receiving unit 121, and reads a data source name (S2101). The data compression unit 125 reads a corresponding list of attribute names 711 from the index generation table 142 (see FIG. 6) (S2102). The data compression unit 125 secures a buffer for creating compressed data on the memory every attribute (S2103) and conducts processing ranging from S2105 to S2113 every attribute until all sensor data are received (S2104).

The data compression unit 125 first reads a list of the division regular time intervals 712 corresponding to the attribute name from the index generation table 142 (S2105), and receives sensor data successively and store them into the buffer area (S2106). The data compression unit 125 makes a decision whether a regular time interval of sensor data in the buffer exceeds a maximum value of the division regular time interval (S2107). If the regular time interval of sensor data in the buffer exceeds the maximum value of the division regular time interval (S2107, Yes), the data compression unit 125 conducts processing at S2108 and subsequent steps. Otherwise (S2107, No), the data compression unit 125 returns to the processing at S2106. For example, in the case where the data source name in FIG. 6 is "gas engine 1" and the attribute name is "water temperature," the data compression unit 125 conducts processing at S2108 and subsequent steps when the regular time interval of sensor data in the buffer has reached one hour.

Then, the data compression unit 125 conducts processing ranging from S2109 to S2111 in order beginning with the shortest division regular time interval in the list of the division regular time intervals 712. In the above-described example, the data compression unit 125 executes the processing in order of 10 minutes, 30 minutes, and then 1 hour (S2108). A decision is made whether the division regular time interval under processing is the minimum value (S2109). If it is the minimum value (S2109, Yes), the data compression unit 125 compresses sensor data in the buffer collectively every division regular time interval (S2110). Otherwise (S2109, No), compressed data collected with a division regular time interval of a low order are collected with a unit falling in the division regular time interval and further compressed (S2111). In the above-described example, three compressed data, each of which is collected with 10 minutes taken as the unit, are further collected with 30 minutes taken as the unit and compressed. If the processing ranging from S2109 to S2111 is conducted for all division regular time intervals, the data compression unit 125 finishes a loop of S2108 (S2112).

And the data compression unit 125 assigns a unique ID number to the compressed data, delivers the ID number, the compressed data, a time period of the compressed data, the data source name, and the attribute name to the data writing unit 122, and clears the buffer (S2113). Upon finishing processing ranging from S2105 to S2113 on all sensor data, the data compression unit 125 sends terminal data to the data writing unit 122 and finishes a loop of S2104 (S2114), and finishes the data compression processing S2100.

Figure 22:
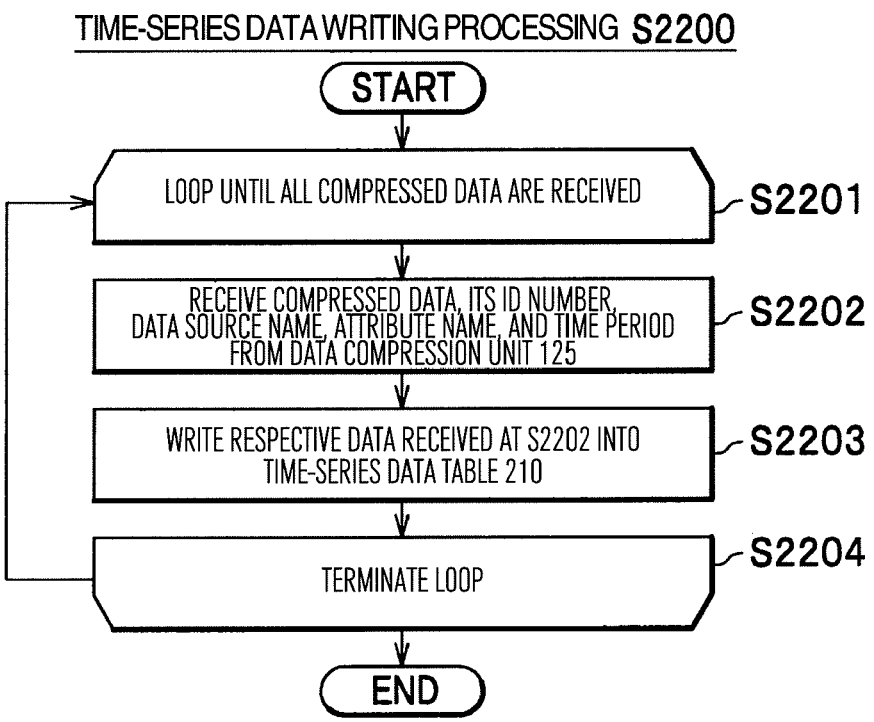
FIG. 22 is a flow chart exemplifying data writing processing conducted by a time-series data writing unit according to the second embodiment.

FIG. 22 is a flow chart exemplifying data writing processing S2200 conducted by the data writing unit 122A. The data writing unit 122A executes S2202 to S2203 until all compressed data are received from the data compression unit 125 (S2201). The data writing unit 122A receives the compressed data, its ID number, the data source name, the attribute name, and the time period from the data compression unit 125 (S2202), and writes the respective data received at S2202 into the time-series data table 210 (S2203). Upon receiving the terminal data from the data compression unit 125, the data writing unit 122A finishes a loop (S2204) and finishes the data writing processing S2200.

Figure 23:
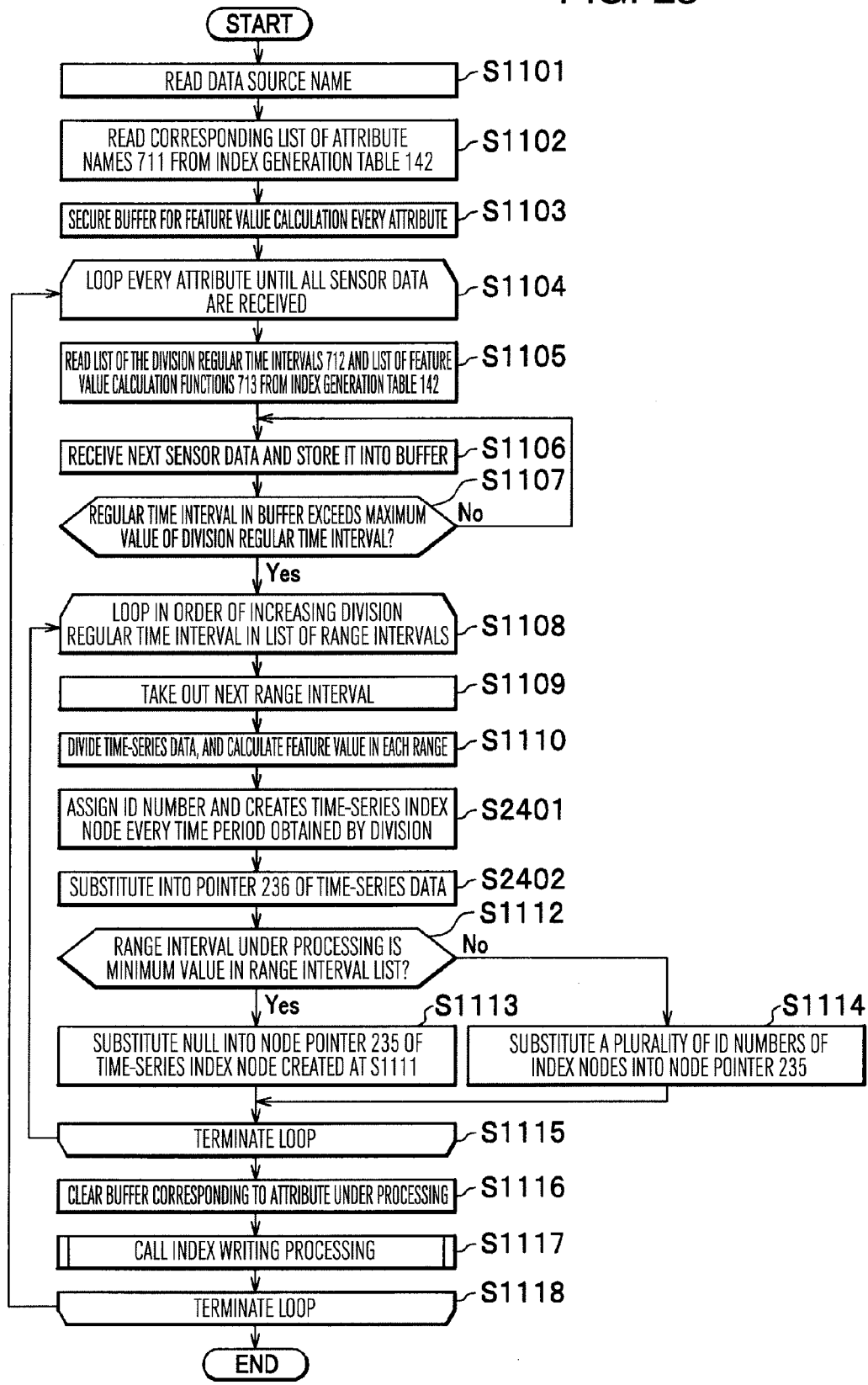
FIG. 23 is a flow chart exemplifying index generation processing conducted by an index generation unit according to the second embodiment.

FIG. 23 is a flow chart exemplifying index generation processing S1100A conducted by the index generation unit 123A. The present processing is the same as the processing in the first embodiment shown in FIG. 11 except S1111 is replaced by S2401 and S2402. Therefore, only S2401 and S2402 will be described.

The index generation processing S1100A differs from the first embodiment in that an address of the compressed data is substituted into the pointer 236 to time-series data when creating an index node. An address of compressed data including series data indicated by the node, i.e., the ID 251 corresponding to the compressed data 255 in the time-series data table 210A (see FIG. 19) is substituted into the pointer 236 (see FIG. 20(b)). In this case, the same address is substituted even if nodes have different division regular time intervals. For example, in the example shown in FIG. 20(a), the same address is substituted into the time-series index nodes 230a, 230c, 230d, 230g, 230h and 230i.

Returning to the description of the processing flow shown in FIG. 23, the index generation unit 123A creates a time-series index node every time period obtained by division, assigns an ID number, and substitutes the "ID number," "start time" and "end time" of each time period, and the "feature value" calculated at S1110 (S2401).

Then, in order to acquire an address of compressed data indicated by the node, the index generation unit 123A takes out a line which includes the time period extracted at S2401 in the time period 254, from the time-series data table 210, takes out the ID 251 in that line, and substitutes the ID 251 into the pointer 236 of the time-series data (S2402).

Figure 24:
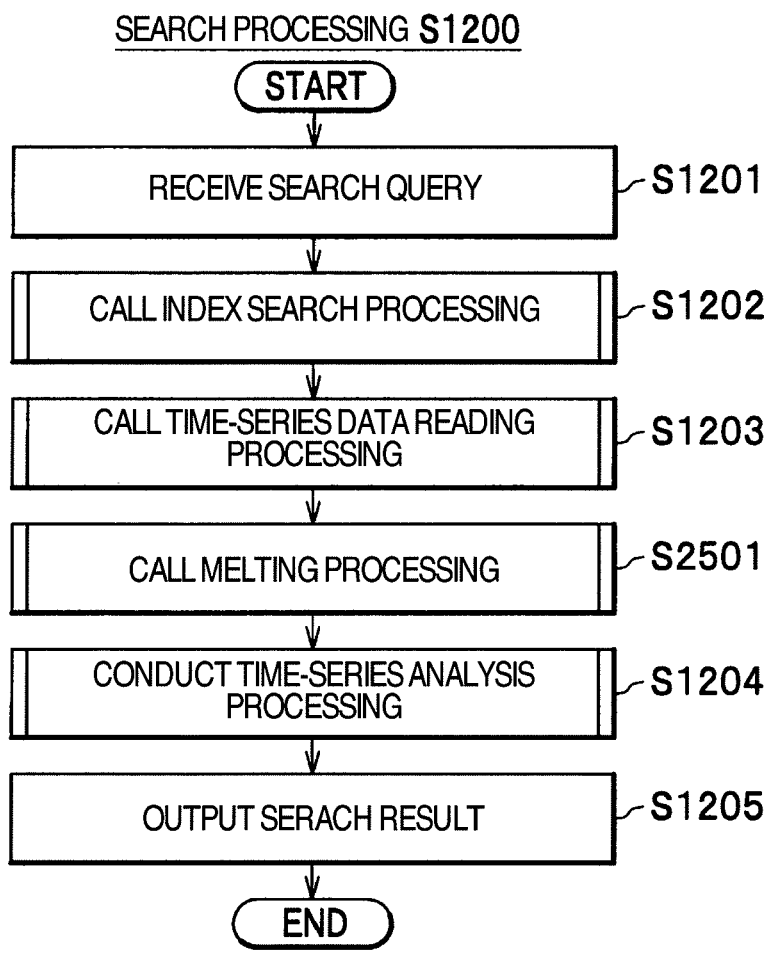
FIG. 24 is a flow chart exemplifying search processing conducted by a search receiving unit according to the second embodiment.

FIG. 24 is a flow chart exemplifying search processing S1200A conducted by the search receiving unit 131. The present processing differs from the processing in the first embodiment shown in FIG. 12 in that "call melting processing" at S2501 is added. The search receiving unit 131 obtains compressed data in time-series data reading processing at S1203. The compressed data is melted, and resultant data is delivered to the time-series analysis unit 135 via the search receiving unit 131A (S2501).

Figure 25:
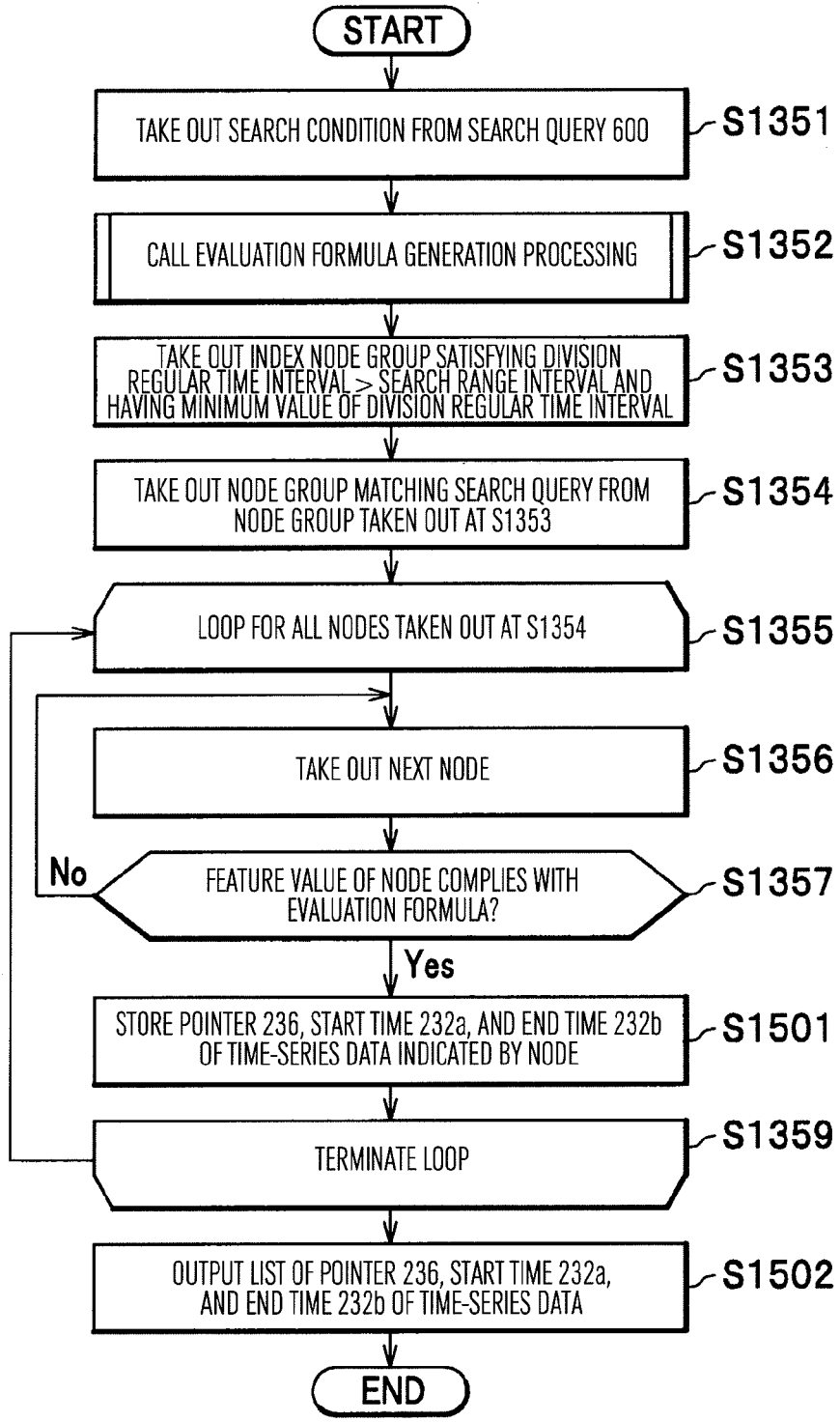
FIG. 25 is a flow chart exemplifying index search processing (regular time interval fixing search) conducted by an index search unit according to the second embodiment.

FIG. 25 is a flow chart exemplifying index search processing (regular time interval fixing search) S1350A conducted by the index search unit 133. Points of difference of FIG. 25 from FIG. 38 in the first embodiment will now be described. Instead of storing section pointers of time-series data as output data at S1358, the pointer 236 (see FIG. 20(b)), the start time 232a, and the end time 232b of time-series data indicated by a node, in other words, the compressed data are stored in a buffer area at S1501. Instead of S1306, a list of the pointer 236, the start time 232a, and the end time 232b of the time-series data existing in the buffer area is output at S1502. Description of other processing will be omitted. By the way, the regular time interval filtering search is also conducted in the same way.

Figure 26:
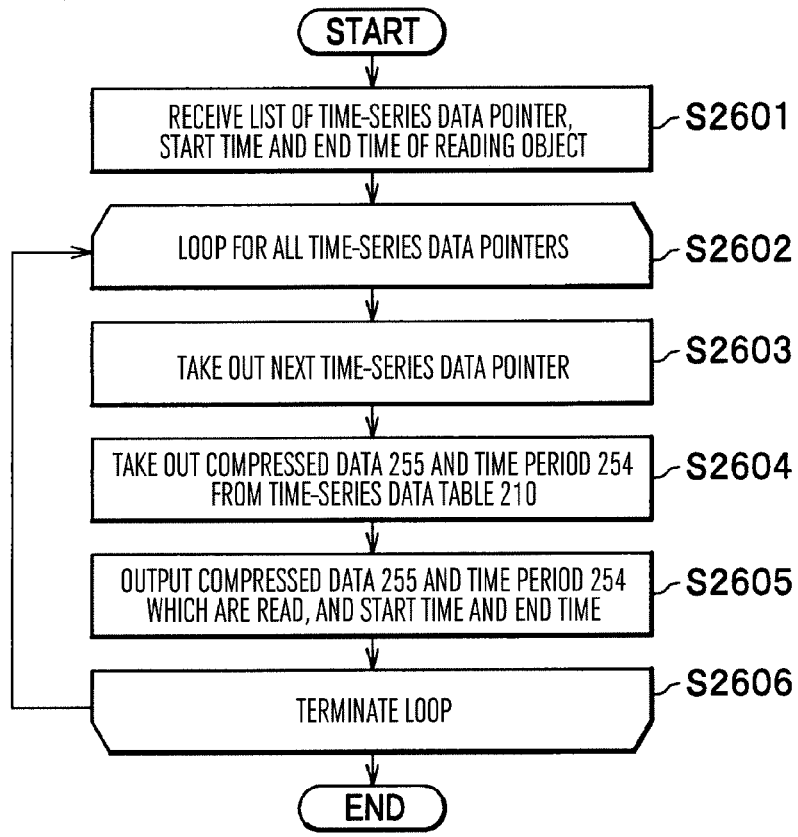
FIG. 26 is a flow chart exemplifying time-series data reading processing conducted by a data reading unit according to the second embodiment.

FIG. 26 is a flow chart exemplifying time-series data reading processing S2600 conducted by the data reading unit 134. The flow chart differs from the flow chart in the first embodiment in that data is read by using the time-series data pointer, in other words, the pointer of the compressed data instead of the time-series data section pointer when reading data.

Upon receiving the list of the time-series data pointer, the start time and the end time of a reading object from the index search unit 133 (S2601), the data reading unit 134 executes processing ranging from S2603 to S2605 (S2602). First, the next time-series data pointer is taken out (S2603), and the compressed data 255 and the time period 254 shown in FIG. 19 are taken out from the time-series data table 210 by using the time-series data pointer (S2604). And the compressed data 255 and the time period 254 which are read, and the start time and the end time received at S2601 are output to the search receiving unit 131 (S2605). By the way, series data between the start time and the end time existing in the time period of the compressed data is melted by the data melting unit 136. Upon executing the processing ranging from S2603 to S2605 on all time-series data pointers, a loop of S2602 is finished and the time-series data reading processing S2600 is finished.

Figure 27:
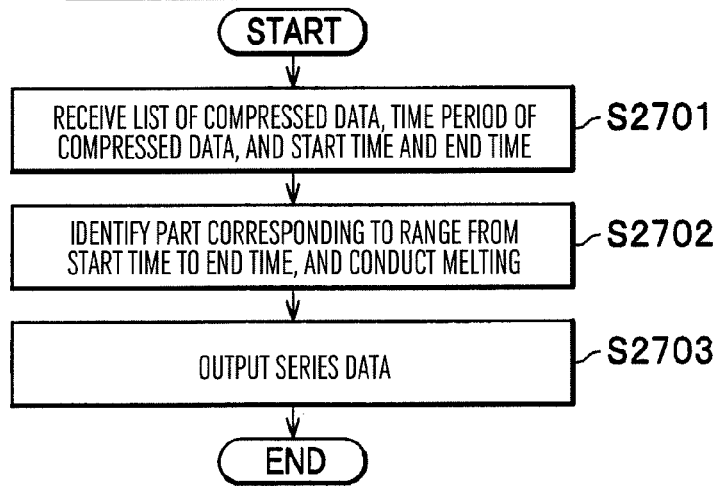
FIG. 27 is a flow chart exemplifying data melting processing conducted by a data melting unit.

FIG. 27 is a flow chart exemplifying data melting processing S2700 conducted by the data melting unit 136. The data melting unit 136 receives a list of compressed data, the time period of the compressed data, and start time and end time of series-data to be taken out from the compressed data (S2701), identifies a series corresponding to a range from the start time to the end time on the basis of the received time period, and conducts melting processing (S2702). By the way, since the compressed data has a hierarchical structure in this case, melting processing is conducted a plurality of times until sensor data is taken out in some cases. Finally, series data taken out is output to the time-series analysis unit 135 (S2703) and the data melting processing S2700 is finished.

Third Embodiment

A third embodiment of the present invention will now be described.

Figure 28:
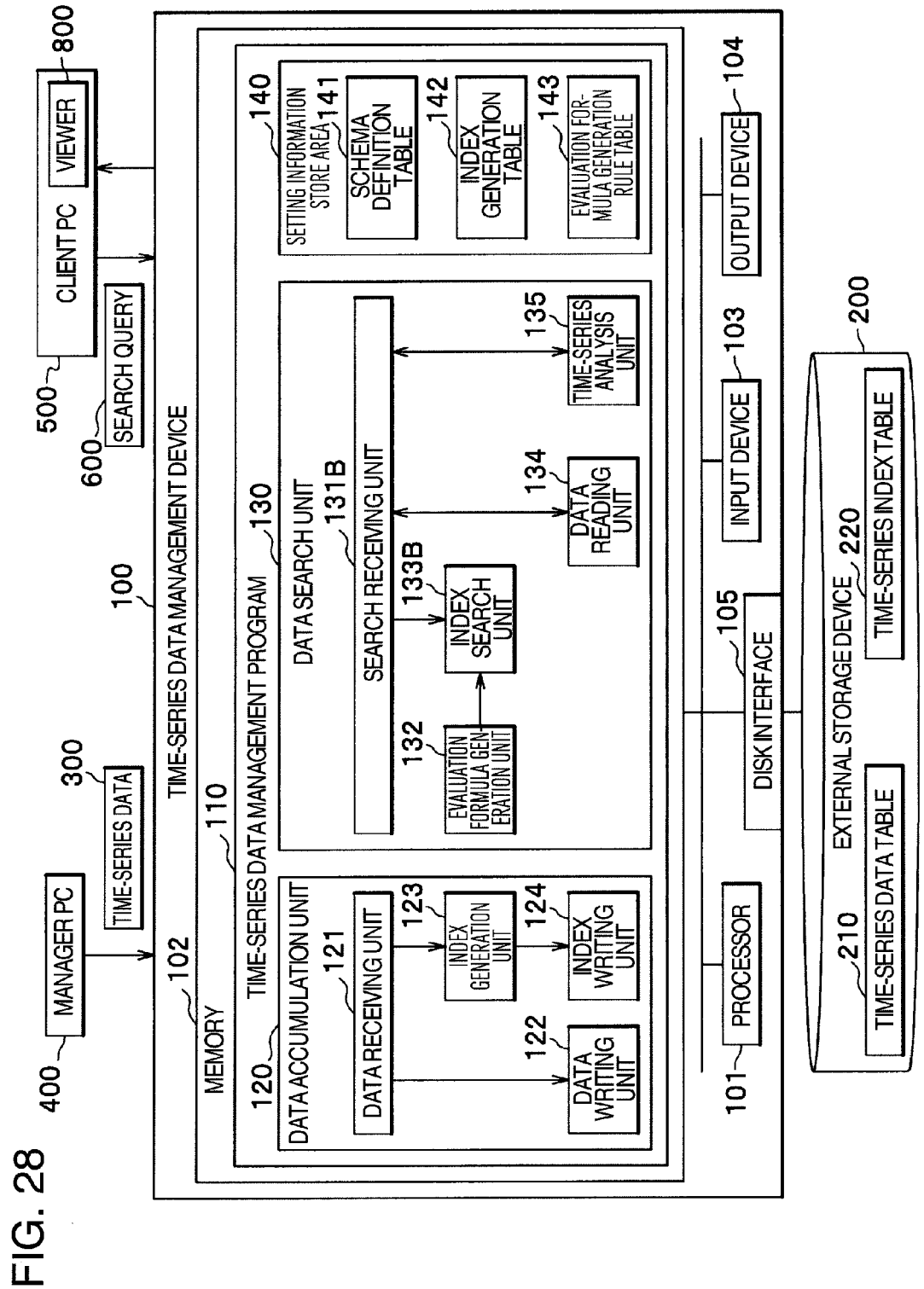
FIG. 28 is a diagram exemplifying a general configuration of a system according to a third embodiment of the present invention.

FIG. 28 is a diagram exemplifying a general configuration of a system according to the third embodiment of the present invention. A viewer 800 for screen display is added to the client PC 500. By the way, the viewer 800 is software for displaying/perusing data and files.

In the present embodiment, the time-series index is not used to filter the data series to conduct time-series search fast, but used to output each feature value retained in the time-series index to the viewer 800 in the client PC 500.

In a flow typically conducted in time-series search, an output result is displayed as a chart and a search pattern is changed by trial and error while confirming the result visually. Especially in the chart display, the output result is viewed as a polygonal line graph with time represented by an abscissa axis and a sensor value represented by an ordinate axis in many cases. If the output data is large in amount, however, it takes long time to display and the user is waited for a long time to confirm the result in some cases. In some cases, the user first peruses all data stored in the time-series data table 210 and grasps a tendency without filtering the search condition. In that case, the influence appears more remarkably. If it is desired to peruse the tendency of the whole data, fast display is demanded rather than accuracy of the output result.

The present embodiment has a feature that output timing for making the display speed fast is controlled in the graph display on the viewer 800. Specifically, as for the feature value which is a representative value of series data, a feature value every wide regular time interval is first displayed and the regular time interval is gradually shortened to conduct precise display. As a result, the user can grasp the tendency of data quickly without waiting for a long time.

The index search unit 133B receives the search query 600 from the search receiving unit 131B, and outputs a feature value in each of time periods obtained by dividing with a specific regular time interval out of time-series indexes in the time-series index table 220, to the search receiving unit. The search receiving unit 131B outputs the output data to the viewer 800.

The viewer 800 draws data which is output from the search receiving unit 131B, on a graph. In the present embodiment, a two-axis line graph having an X axis as time and a Y axis as the sensor value is used as the graph. Processing other than the above-described processing is the same as that in the first embodiment, and consequently description thereof will be omitted.

Figure 29:
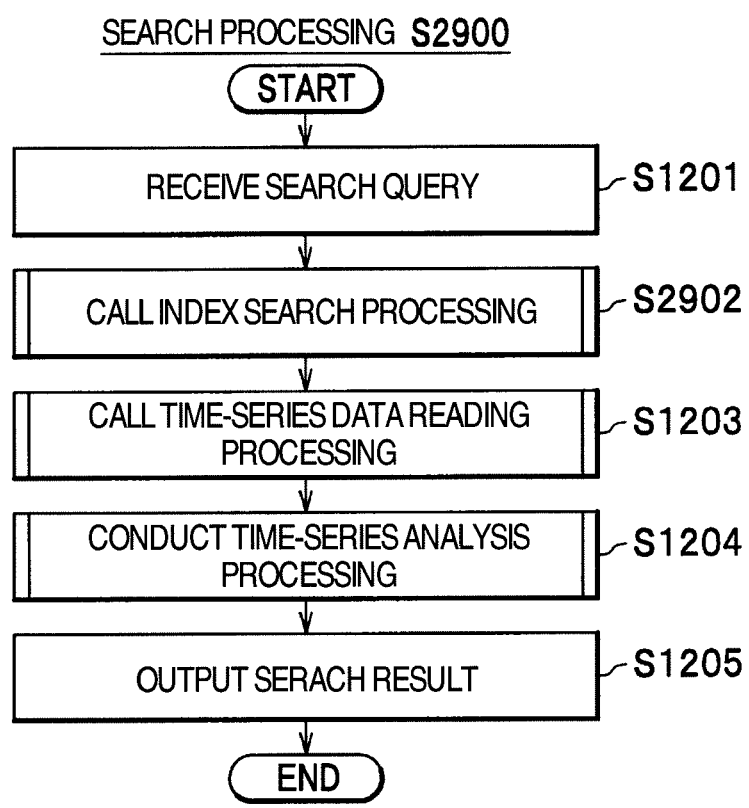
FIG. 29 is a flow chart exemplifying search processing conducted by a data receiving unit according to the third embodiment.

FIG. 29 is a flow chart exemplifying search processing S2900 conducted by the search receiving unit 131B according to the third embodiment. In the first embodiment shown in FIG. 12, the index search processing S1300 shown in FIG. 13 is executed at S1202. In the third embodiment shown in FIG. 29, after receiving the search query 600, the index search unit 133B executes index search processing S3000 shown in FIG. 30 at S2902.

By the way, in the present embodiment, an example in which a feature value is output and then time-series data is read and output in order to output more accurate data at S1203 and subsequent steps is shown. However, it is also possible to output only a feature value without outputting time-series data. In this case, the processing at S1203 and subsequent steps is omitted. Furthermore, after the feature value is calculated, time-series data need not be stored in the time-series data table 210, but may be deleted.

Figure 30:
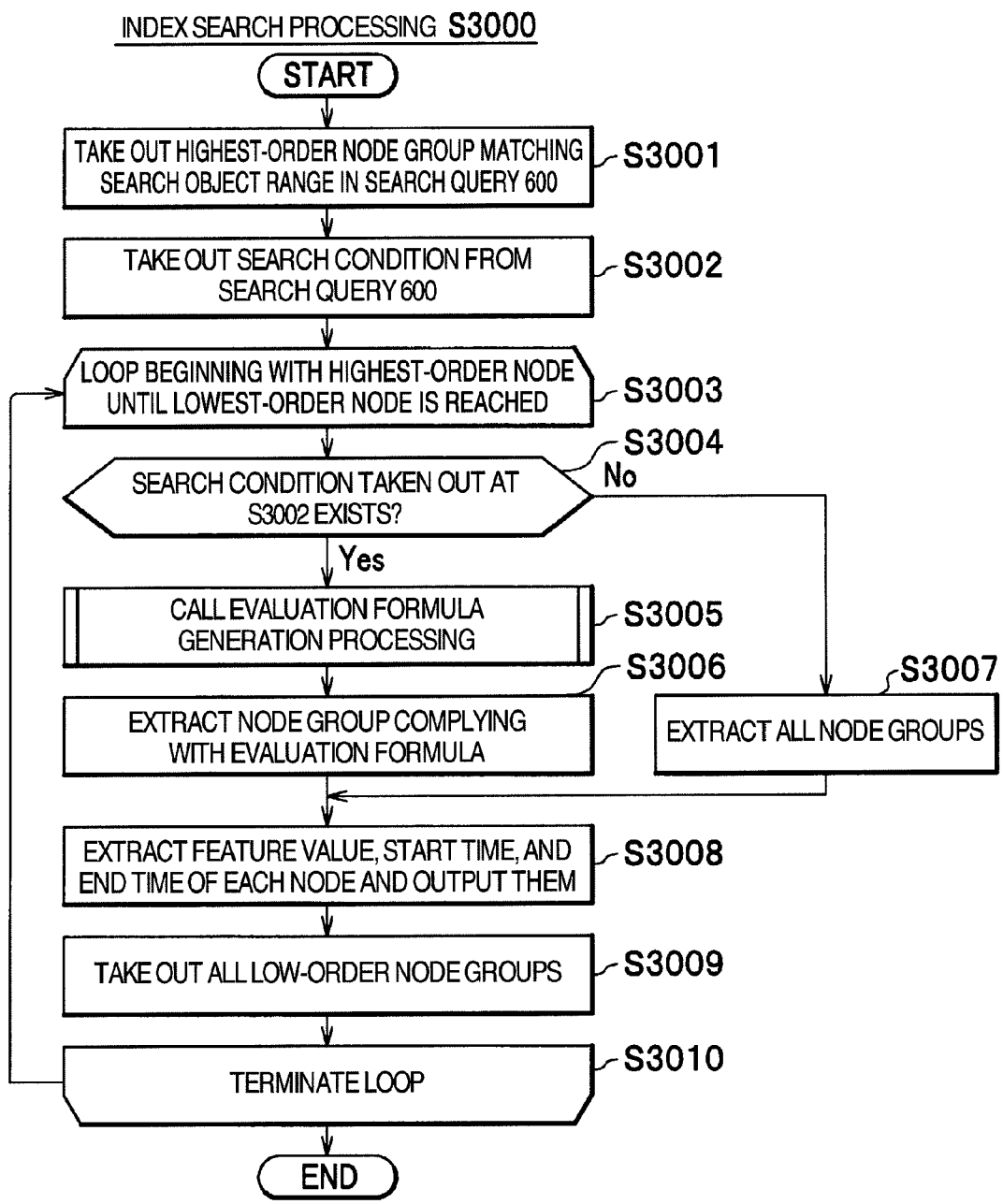
FIG. 30 is a flow chart exemplifying index search processing conducted by an index search unit according to the third embodiment.

FIG. 30 is a flow chart exemplifying index search processing S3000 conducted by the index search unit 133B. The index search unit 133B receives the search query 600 from the data receiving unit 121, and takes out a highest-order node group matching the search object range 630 in the search query 600 (S3001). Then, the index search unit 133B takes out the search condition 640 from the search query 600 (S3002), and executes processing ranging from S3004 to S3009 beginning with a highest-order node until a lowest-order node is reached (S3003).

The index search unit 133B makes a decision whether the search condition taken out at S3002 exists (S3004). If the search condition exists (S3004, Yes), i.e., a search with a condition specified is to be conducted, then the index search unit 133B executes S3005 and S3006. Otherwise (S3004, No), i.e., a search of all data without specifying a condition is specified, the index search unit 133B executes S3007.

The index search unit 133B calls the evaluation formula generation processing S1400 (see FIG. 14) (S3005), receives the evaluation formula, applies the evaluation formula to all node groups of a processing object, and extracts a complying node group (S3006). At the S3007, all node groups which become a processing object, i.e., all nodes having the same division regular time interval are extracted (S3007).

And the index search unit 133B extracts a feature value, start time, and end time of each node and outputs them to the data receiving unit 121. As the feature value used here, an arbitrary feature value can be used. In the description of the present embodiment, however, it is supposed that "average (AVG)" is used as a typical feature value. Because the average value is suitable for describing a rough feature of a data series in the time period.

Here, all feature values in a specific time period have been output. Then, in order to output detail values, the index search unit 133B takes out all node groups in a layer which is lower in order by one (S3009) and executes S3004 and subsequent steps repeatedly again. If the lowest order node is reached and the processing ranging from S3004 to S3009 on all nodes is finished, the index search unit 133B finishes a loop of S3003 (S3010) and finishes the index search processing S3000.

Figure 31:
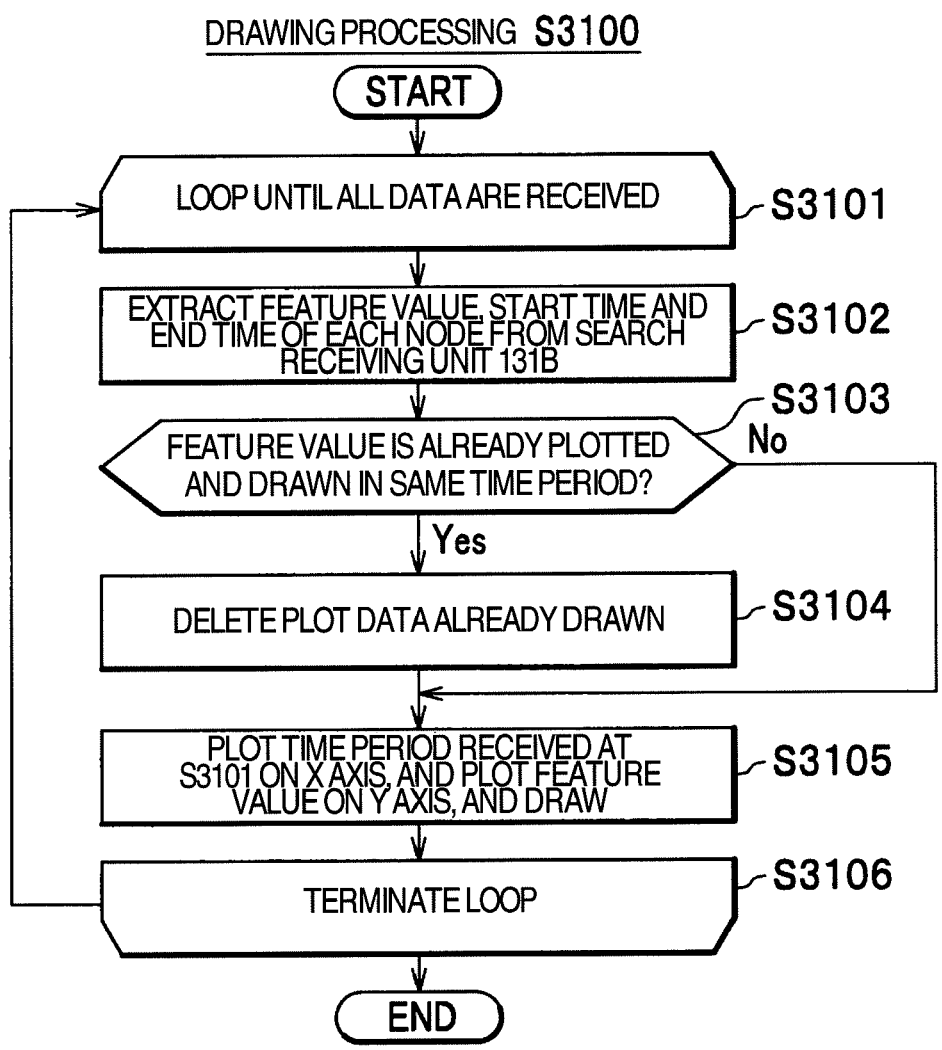
FIG. 31 is a flow chart exemplifying drawing processing conducted by a viewer.

FIG. 31 is a flow chart exemplifying drawing processing S3100 conducted by the viewer 800. In the drawing processing S3100, the feature value in each time period received from the data receiving unit 121 is first displayed coarsely with a long regular time interval and re-displayed with a gradually shortened regular time interval. Until all data are received from the data receiving unit 121, the viewer 800 executes S3102 to S3105 (S3101).

The viewer 800 extracts a feature value, start time and end time of each node from the search receiving unit 131B (S3102), and makes a decision whether a feature value is already plotted and drawn in the same time period (S3103). If a rough drawing in a higher-order regular time interval is left (S3103, Yes), the viewer 800 deletes the plot data (S3104). And the viewer 800 plots the time period from the start time to the end time extracted at S3102 on an X axis on the screen, and in that range, plots a feature value, for example, the average value on a Y axis and draws (S3105). Upon receiving all data, the viewer 800 finishes the processing ranging from S3102 to S3105, finishes a loop of S3101 (S3106), and finishes the drawing processing S3100.

Fourth Embodiment

A fourth embodiment of the present invention will now be described.

Figure 32:
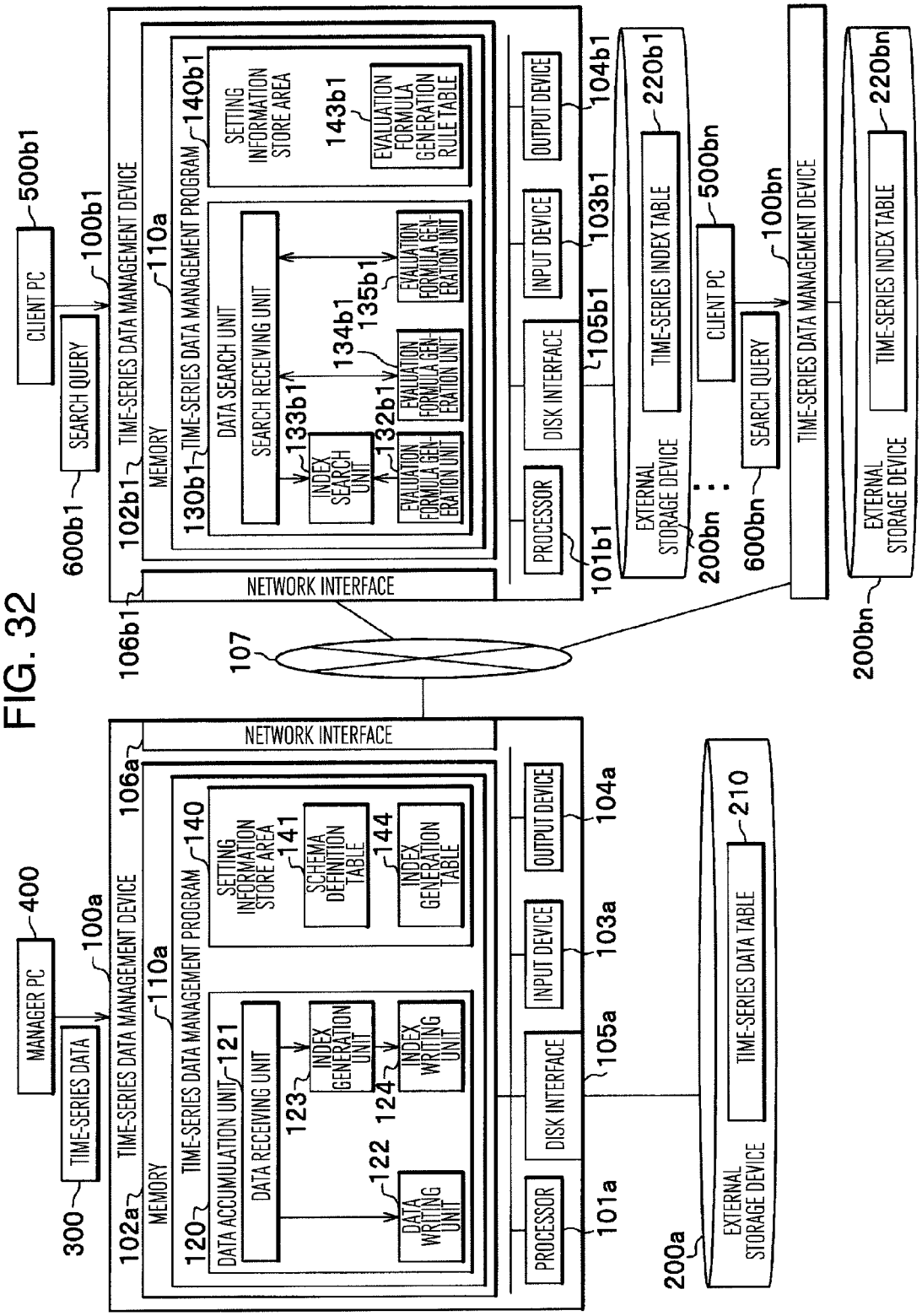
FIG. 32 is a diagram exemplifying a general configuration of a system according to a fourth embodiment of the present invention.

FIG. 32 is a diagram exemplifying a general configuration of a system according to the fourth embodiment of the present invention. In the present embodiment, an example in which a search of time-series data is performed from a plurality of client PCs 500b (500b1, ..., 500bn) is shown.

In the case where the number of client PCs 500b (500b1, ..., 500bn) which execute the search has increased, there is a fear of performance degradation due to the increase of the search load. Therefore, it is an aim of the present configuration to scatter the load and prevent degradation of the search performance by scattering the disposition of search executing devices.

In addition, the search pattern of the time-series data 300 is diversified according to the client. For example, in the case where sale results of a certain product are accumulated, a client A belonging to a production control division searches sales patterns of immediately preceding several days in order to make a future production plan. On the other hand, a client B belonging to a management division searches sales patterns of immediately preceding several months to several years in order to make a future product plan.

Considering the above-described situation, a system in the present embodiment includes one time-series data management device 100a (first management device) which accumulates time-series data and which retains a time-series data table 210, and a plurality of time-series data management devices 100b (100b1, ..., 100bn) (second management devices) which retain time-series index tables 220b (220b1, ..., 220bn) and which execute a search in response to a search request from a client PC. The devices are connected to a network 107 via network interfaces 106 (106a, 106b1, ..., 106n) to be able to communicate.

By the way, it is supposed that the time-series index tables 220b (220b1, ..., 220bn) respectively suitable for different search patterns are stored in the time-series data management devices 100b for search. However, it is also possible for a plurality of devices to retain the same time-series index table 220b simply with the object of only load scattering.

Hereafter, the present configuration will be described. The time-series data management device 100a is a device for accumulating time-series data, and has a time-series data table 210 in an external storage device 200a (first storage device). In addition, the time-series data management device 100a conducts processing of creating a time-series index in the time-series index table 220b in an arbitrary time-series data management device 100b. Specifically, an index writing unit 124 conducts processing of storing a time-series index generated by an index generation unit 123 into an external storage device in another management device. At this time, a reference destination device is determined by referring to an index generation table 144. Although described in detail later, the index generation table 144 stores a store destination device address of a time series index in addition to components of the index generation table 142 in the first embodiment.

In addition, the time-series data management device 100a conducts processing of conducting centralized management on time-series data which become search objects of the time-series data management devices 100b for search, taking out a data series from the time-series data table 210 in response to a data acquisition request from the time-series data management device 100b, and outputting the data series to the time-series data management device 100b.

The time-series data management device 100b for search is a device for executing a search of time-series data, and has the time-series index table 220b in an external storage device 200b (200b1, ..., 200bn) (second storage device). It is considered that the client PCs 500b (500b1, ..., 500bn) utilizing respective time-series data management devices 100b for search execute different search queries 600b (600b1, ..., 600bn), respectively. The time-series index tables 220b suitable for search patterns are stored in respective devices. The data search unit 130b (130b1, ..., 130bn) filters data series of an object and extracts a data series by referring to the time-series index table 220b, and executes a time-series analysis.

Unlike the processing in the first embodiment, the data search unit 130b (130b1, ..., 130bn) does not read a data series from a storage device connected thereto after it has filtered object data series, but conducts processing of reading a data series from the time-series data table 210 managed by the time-series data management device 100a for storage, via the network 107.

FIG. 33 is a table diagram exemplifying the index generation table 144. The index generation table 144 has a configuration obtained by adding a generation destination device address 714 to the index generation table 142 shown in FIG. 6. The generation destination device address 714 is an identifier of a data management device for search which indicates a creation destination of a time-series index. In the example of the present embodiment, an IP address of each time-series data management device 100b is used as the generation destination device address 714. It is also possible to dispose a plurality of different time-series indexes in different time-series data management devices 100b with respect to one attribute of time-series data. For example, in the case where the data source name is "gas engine 1" and the attribute name is "water temperature" in the example shown in FIG. 33, time-series indexes having different division regular time intervals and feature value calculation functions are generated in a time-series data management device 100b having an address "192.168.10.3" and a time-series data management device 100b having an address "192.168.10.2," respectively.

Furthermore, it is also possible to create the same time-series index on a plurality of time-series data management devices 100b with respect to one attribute of time-series data. For example, in the case where the data source name is "gas engine 1" and the attribute name is "pressure." the same time-series index is generated in two time-series data management devices 100b respectively having an address "192.168.10.1" and an address "192.168.10.2." Components of the index generation information except the generation destination device address 714 are the same as those in the first embodiment, and consequently description of them will be omitted.

Figure 34:
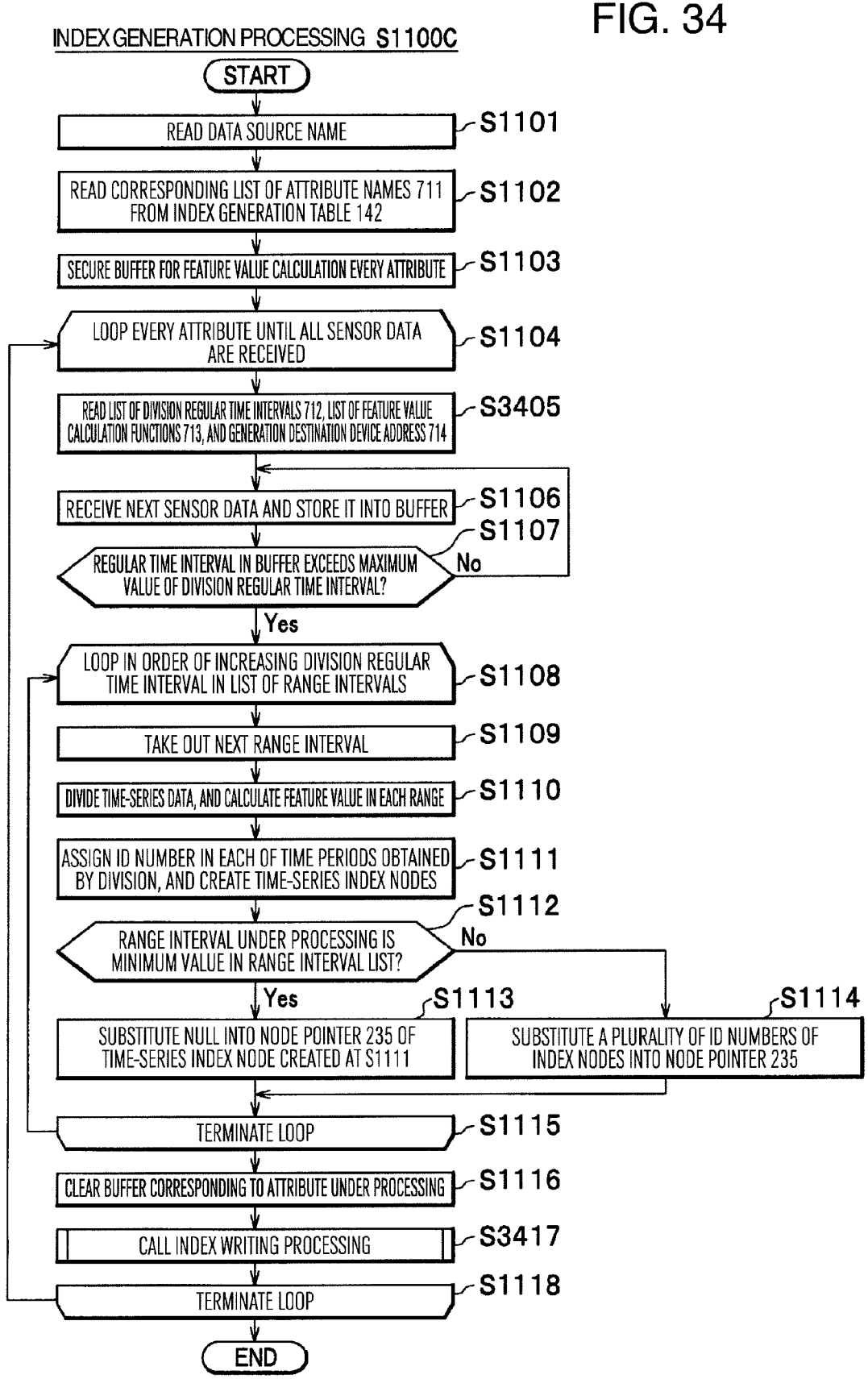
FIG. 34 is a flow chart exemplifying index generation processing conducted by an index generation unit according to the fourth embodiment.

FIG. 34 is a flow chart exemplifying index generation processing S1100C conducted by the index generation unit 123. The present processing is the same as the index generation processing 1100 in the first embodiment shown in FIG. 11 except that S1105 is replaced by S3405 and S1117 is replaced by S3417. Accordingly, S3405 and S3417 will be described.

When creating an index node, the index generation unit 123 reads the generation destination device address 714 in the index generation table 144 in order to identify a store destination device of the time-series index of time-series data. This point differs from the first embodiment. At S3405, the index generation unit 123 reads a list of the division regular time intervals 712, a list of the feature value calculation functions 713, and the generation destination device address 714 corresponding to an attribute name from the index generation table 144. And when the index generation unit 123 calls index writing processing S3600 (see FIG. 36), the index generation unit 123 delivers the generation destination device address acquired previously as well, in addition to the data source name, the attribute name, and index data (S3417).

Figure 36:
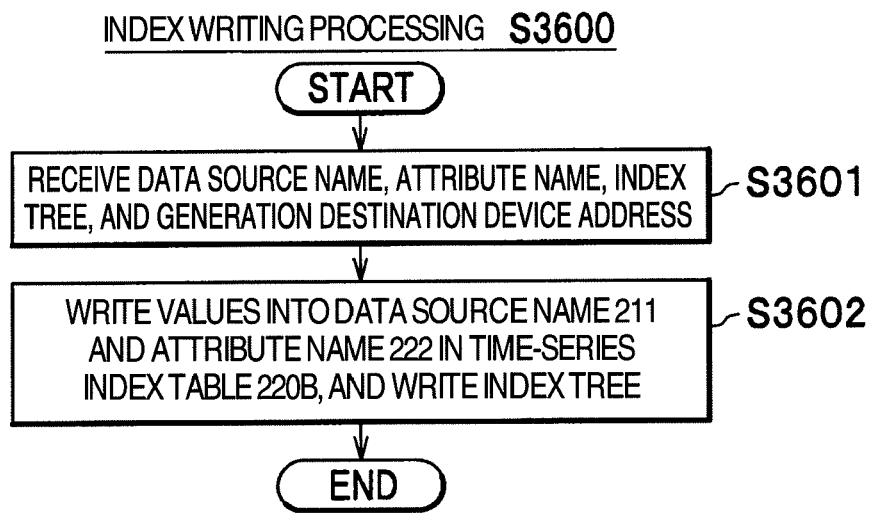
FIG. 36 is a flow chart exemplifying index writing processing conducted by an index writing unit according to the fourth embodiment.

FIG. 36 is a flow chart exemplifying the index writing processing S3600 conducted by the index writing unit 124. In the present processing, the index writing unit 124 conducts processing of writing a time-series index into the time-series index table 220b. Hereafter, a flow of the processing will be described.

The index writing unit 124 receives the data source name, the attribute name, the index tree, and the generation destination device address from the index generation unit 123 (S3601). And the index writing unit 124 writes received values into the data source name 211 and the attribute name 222 in the time-series index table 220b in the external storage device 200b connected to the time-series data management device 100b which is indicated by the generation destination device address, and writes the index tree into the index data 223 (S3602).

By the way, in the present embodiment, a means for writing data into a specified address via the network is implemented by mounting and calling a database connection API which is configured as the API (Application Programming Interface) such as, for example, JDBC and ODBC (Open Database Connectivity), or configured as another API unique to a DBMS (DataBase Management System).

Figure 37:
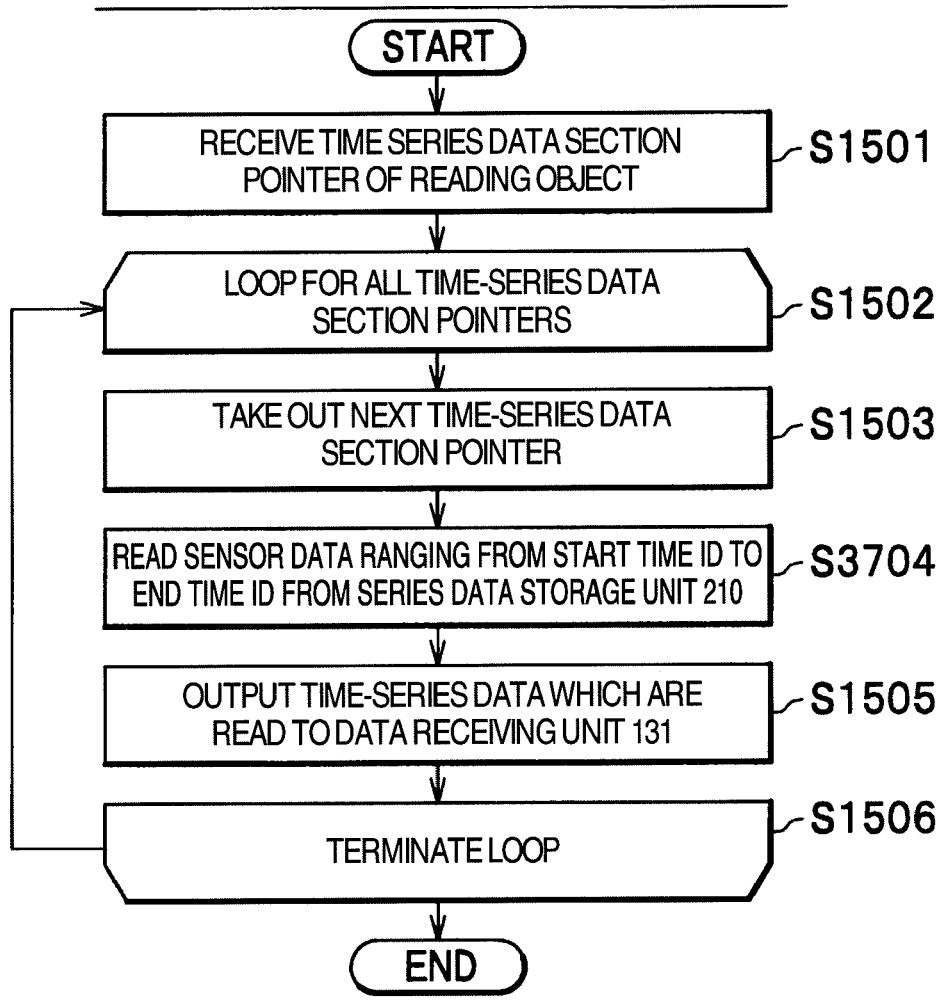
FIG. 37 is a flow chart exemplifying time-series data reading processing conducted by a data reading unit according to the fourth embodiment.

FIG. 37 is a flow chart exemplifying time-series data reading processing S1500C conducted by the data reading unit 134b. The present processing is the same as the time-series data reading processing S1500 in the first embodiment shown in FIG. 15 except that S1504 is replaced by S3704. Accordingly, processing at S3704 will be described and description of other processing will be omitted.

In the time-series data reading processing 1500C conducted by the data reading unit 134b, the data reading unit 134b does not read time-series data from the external storage device 200b connected to its own time-series data management device 100b, but the data reading unit 134b conducts processing of reading time-series data (sensor data) from the external storage device 200a connected to the time-series management device 100a for storage via the network 107 (S3704).

By the way, when reading data in the present embodiment, the data reading unit 134b specifies an IP address of the time-series data management device 100a for storage and reads data. Its concrete means is implemented by mounting and calling a database connection API which is configured as the API such as, for example, JDBC and ODBC, or configured as another API unique to a DBMS in the same way as the above-described time-series index writing processing.

Heretofore, the present invention has been described on the basis of the present embodiment. However, the present invention is not restricted to the embodiments, but various changes can be made without departing from the spirit.

When making a time-series analysis on time-series data stored on a disk, according to the present embodiment, only time-series data having a possibility of matching a specified search pattern is filtered and read from the disk. As a result, it is possible to prevent frequent occurrence of the disk I/O generated at the time of disk reading and the time required for a search can be shortened.

REFERENCE SIGNS LIST

100: Time-series data management device
100a: Time-series data management device (first management device)
100b: Time-series data management device (second management device)
101: Processor
102: Memory
103: Input device
104: Output device
105: Disk interface
110: Time-series data management program
120: Data accumulation unit
121: Data receiving unit
122: Data writing unit
123: Index generation unit
124: Index writing unit
130: Data search unit
131: Search receiving unit
132: Evaluation formula generation unit
133: Index search unit
134: Data reading unit
135: Time-series analysis unit 140: Setting information store area
141: Schema definition table (schema definition information)
142: Index generation table (index generation information)
143: Evaluation formula generation rule table (evaluation formula generation rule information)
200: External storage device
200a: External storage device (first storage device)
200b: External storage device (second storage device)
210: Time-series data table (time-series data information)
220: Time-series index table (time-series index information)
300: Time-series data
400: Manager PC
500: Client PC (client)
600: Search query
610: Search range interval ("select_range" phrase)
620: Search item ("select_items" phrase)
630: Search object range ("where_timerange" phrase)
640: Search condition ("where_condition" phrase)

The invention claimed is:

1. A time-series data management device comprising:
a processor for accumulating time-series data of a search object into a storage device; and searching the accumulated time-series data for a data series complying with a search query which is input from a client;
the time-series data being obtained from sensors which monitor status of an apparatus and including a data group in which the data from each sensor is arranged in time series,
the processor configured to:
calculate a feature value of a data series of hierarchical time intervals, the data series being in a time period divided by specific regular time interval, by associating the time-series data received moment-by-moment with the sensors of the apparatus to be monitored, when accumulating the time-series data;
write the calculated feature value of the data series of hierarchical time intervals associated with the sensors of the apparatus, into the storage device as time-series index information; and
write the time-series data associated with the sensor of the apparatus into the storage device as time-series data information,
generate an evaluation formula to make a decision as to degrees of compliance with each feature value in the time-series index information and the search query, when searching the time-series data;
make a decision whether or not a feature value of every time period included in the time-series index information complies with the evaluation formula by using the evaluation formula, and when identifying a complying time period of a data series group, extracting the time period wider than a search range interval in the search query, specifying the feature value of the extracted time period which complies with the evaluation formula, if the feature value is specified, identifying the time period which includes the feature value complying with the evaluation formula by repeating the decision making process for lower layer time period which belongs to the same period as the specified time period and having narrower interval than the specified time period until the time period is close to the search range interval;
extract a data series corresponding to the identified time period from the time-series data information; and
collate the extracted data series with a search condition in the search query.

2. The time-series data management device according to claim 1, wherein
the time-series index information comprises an index hierarchical structure composed of a plurality of time-series indexes, every attribute name in the time-series data, and
the time-series index includes the time period including the start time and the end time of the time-series data, the feature value of the time period, and the node pointer of subordinate time-series indexes included in the index hierarchical structure.

3. The time-series data management device according to claim 1, wherein
the data accumulation unit further comprises:
a data compression unit which compresses the time-series data and delivers the compressed time-series data to the data writing unit, when accumulating the time-series data into the storage device, and
the data search unit further comprises:
a data melting unit for melting the compressed data delivered from the data reading unit, when searching the time-series data.

4. The time-series data management device according to claim 2, wherein with respect to the time-series index, the index search unit links feature values in adjacent time periods, and thereby calculates a feature value corresponding to a plurality of division regular time intervals, make a decision as to the calculated feature value according to an evaluation formula, and identify a time period of a complying data series group.

5. The time-series data management device according to claim 4, wherein when calculating a feature value of a data series in the specific regular time interval, the index generation unit changes the specific regular time interval, and calculates the regular time interval to cause the specific regular time interval to change according to a variation of a value of the time data series.

6. The time-series data management device according to claim 5, wherein as for the calculation of the regular time interval, the regular time interval is made large in a time period in which the variation of the data series is less than a predetermined level, whereas the regular time interval is made small in a time period in which the variation of the data series is at least the predetermined level.

7. The time-series data management device according to claim 5, wherein the feature value calculated by the index generation unit is an upper-lower limit range using a minimum value and a maximum value of a data series of every specific regular time interval,
the evaluation formula generation unit generates a search condition included in the search query as an evaluation formula for evaluating the upper-lower limit range, and
the index search unit compares the upper-lower limit range of the data series with the evaluation formula and makes a decision.

8. The time-series data management device according to claim 6, wherein the index generation unit calculates a feature value of time-series data every a plurality of different regular time intervals, and generates time-series indexes having a hierarchical structure in which a feature value corresponding to a first regular time interval is included in a feature value corresponding to a second regular time interval which is longer than the first regular time interval and which belongs to same time period as the first regular time interval, and
the index search extracts a time period having the regular time interval close to a search range interval included in the search query, makes a decision as to a feature value in the time period according to the evaluation formula, and thereby identifies a complying time period.

9. The time-series data management device according to claim 7, wherein the client comprises a viewer for displaying a time period and a feature value of a data series group received from the index search unit, on a display unit.

10. The time-series data management device according to claim 8, wherein
with respect to the time-series indexes having the hierarchical structure, the index search unit makes a decision as to a feature value according to the evaluation formula successively beginning with a long regular time interval,
if the feature value complies with the evaluation formula, the index search unit conducts processing of successively evaluating feature values corresponding to time period which is shorter than the regular time interval and which belong to same time period as the time period, repeatedly until a resultant regular time interval becomes close to the search range interval, and
thereby the index search unit identifies a time period complying with the evaluation formula.

11. The time-series data management device according to claim 9, wherein
the index generation unit calculates a feature value of time-series data every a plurality of different regular time intervals, and generates time-series indexes having a hierarchical structure in which a feature value corresponding to a first regular time interval is included in a feature value corresponding to a second regular time interval which is longer than the first regular time interval and which belongs to same time period as the first regular time interval,
the index search unit outputs a feature value which complies with the evaluation formula in a long time period, and outputs that in a shorter time period successively in stages, and
the viewer displays the feature values received from the index search unit in stages by repeating re-drawing.

12. The time-series data management device according to claim 9, wherein
the feature value calculated by the index generation unit is an upper-lower limit range using a minimum value and a maximum value of a data series of every specific regular time interval,
the evaluation formula generation unit generates a search condition included in the search query as an evaluation formula for evaluating the upper-lower limit range,
the index search unit makes a decision as to the upper-lower limit range of the data series on the basis of the evaluation formula, outputs an average value of the data series as a feature value in a complying time period, and transmits the average value to the client, and
the viewer of the client draws the transmitted average value on the display unit.

13. The time-series data management device according to claim 10, wherein with respect to the time-series indexes having the hierarchical structure, the index generation unit links feature values in adjacent regular time intervals at arbitrary timing, thereby calculates a feature value corresponding to a plurality of regular time intervals, and reconfigures the time-series indexes by regarding the plurality of regular time intervals as a new regular time interval.

14. A time-series data management method using a time-series data management device including a data accumulation unit for accumulating time-series data of a search object into a storage device, and a data search unit for searching the accumulated time-series data for a data series complying with a search query which is input from a client
the time-series data being obtained from sensors which monitor status of an apparatus and including a data group in which the data from each sensor is arranged in time series,
the data accumulation unit comprising and executing:
an index generation step of calculating a feature value of a data series of hierarchical time intervals, the data series being in a time period divided by specific regular time interval, by associating the time-series data received moment-by-moment with the sensors of the apparatus to be monitored, when accumulating the time-series data;
an index writing step of writing the calculated feature value of the data series of hierarchical time intervals associated with the sensors of the apparatus, into the storage device as time-series index information; and
a data writing step of writing the time-series data associated with the sensor of the apparatus into the storage device as time-series data information, and
the data search unit comprising and executing:
an evaluation formula generation step of generating an evaluation formula to make a decision as to degrees of compliance with each feature value in the time-series index information and the search query, when searching the time-series data;
an index search step of making a decision whether or not a feature value of every time period included in the time-series index information complies with the evaluation formula by using the evaluation formula, and when identifying a complying time period of a data series group, extracting the time period wider than a search range interval in the search query, specifying the feature value of the extracted time period which complies with the evaluation formula, if the feature value is specified, identifying the time period which includes the feature value complying with the evaluation formula by repeating the decision making process for lower layer time period which belongs to the same period as the specified time period and having narrower interval than the specified time period until the time period is close to the search range interval;
a data reading step of extracting a data series corresponding to the identified time period from the time-series data information; and
a time-series analysis step of collating the extracted data series with a search condition in the search query.

* * * * *